US009714772B2

(12) United States Patent
Modi et al.

(10) Patent No.: US 9,714,772 B2
(45) Date of Patent: Jul. 25, 2017

(54) HVAC CONTROLLER CONFIGURATIONS THAT COMPENSATE FOR HEATING CAUSED BY DIRECT SUNLIGHT

(71) Applicant: Google Inc., Mountain View, CA (US)

(72) Inventors: Yash Modi, Foster City, CA (US); Yoky Matsuoka, Palo Alto, CA (US); John B. Filson, Mountain View, CA (US)

(73) Assignee: Google Inc., Mountain View, CA (US)

(*) Notice: Subject to any disclaimer, the term of this patent is extended or adjusted under 35 U.S.C. 154(b) by 1131 days.

(21) Appl. No.: 13/835,321

(22) Filed: Mar. 15, 2013

(65) Prior Publication Data

US 2013/0204442 A1 Aug. 8, 2013
US 2017/0168511 A9 Jun. 15, 2017

Related U.S. Application Data

(63) Continuation-in-part of application No. 13/034,666, filed on Feb. 24, 2011, now Pat. No. 9,494,332.
(Continued)

(51) Int. Cl.
*F24F 11/00* (2006.01)
*G05B 15/02* (2006.01)
(Continued)

(52) U.S. Cl.
CPC ........ *F24F 11/006* (2013.01); *F24F 11/0009* (2013.01); *F24F 11/0086* (2013.01);
(Continued)

(58) Field of Classification Search
CPC .... G05D 23/19; G05D 23/02; G05D 23/1928; G05D 23/1902; F24F 11/0009;
(Continued)

(56) References Cited

U.S. PATENT DOCUMENTS 3,991,357 A 11/1976 Kaminski
4,183,290 A 1/1980 Kucharczyk
(Continued)

FOREIGN PATENT DOCUMENTS

CA 2202008 2/2000
EP 196069 12/1991
(Continued)

OTHER PUBLICATIONS

Aprilaire Electronic Thermostats Model 8355 User's Manual, Research Products Corporation, Dec. 2000, 16 pages.
(Continued)

*Primary Examiner* — Robert Fennema
*Assistant Examiner* — Jennifer L Norton
(74) *Attorney, Agent, or Firm* — Kilpatrick Townsend & Stockton LLP

(57) ABSTRACT

A thermostat may include a housing, a user interface, temperature sensors providing temperature sensor measurements, and a processing system configured to control an HVAC system based on a comparison of a determined ambient temperature and a setpoint temperature. The thermostat may (i) determine time intervals in which direct sunlight is incident on the thermostat; (ii) during time intervals in which direct sunlight is not incident on the thermostat, process the temperature sensor measurements according to a first ambient temperature determination algorithm to compute the determined ambient temperature; and (iii) during time intervals in which it is determined that direct sunlight is incident on the thermostat, process the temperature sensor measurements according to a second ambient temperature determination algorithm to compute the determined ambient temperature that compensates for a heating of the thermostat caused by the direct sunlight.

18 Claims, 14 Drawing Sheets

Related U.S. Application Data

(60) Provisional application No. 61/415,771, filed on Nov. 19, 2010, provisional application No. 61/429,093, filed on Dec. 31, 2010.

(51) Int. Cl.
   *G05D 23/19* (2006.01)
   *G06F 17/14* (2006.01)

(52) U.S. Cl.
   CPC .............. *G05B 15/02* (2013.01); *G05D 23/19* (2013.01); *G05D 23/1902* (2013.01); *G06F 17/142* (2013.01); *F24F 2011/0049* (2013.01); *F24F 2011/0061* (2013.01); *F24F 2011/0091* (2013.01); *G05D 23/1928* (2013.01)

(58) Field of Classification Search
   CPC ........... F24F 11/0086; F24F 2011/0091; F24F 2011/0049; F24F 11/006; F24F 2011/0061; G05B 15/02; G05F 17/142
   IPC ................. F24F 11/0009,11/006, 11/0086, 2011/0049, 2011/0061, 2011/0091; G05B 15/02; G05D 23/19, 23/1902, 23/1928; G05F 17/142
   See application file for complete search history.

(56) References Cited

U.S. PATENT DOCUMENTS

| | | | |
|---|---|---|---|
| 4,223,831 A | 9/1980 | Szarka | |
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,741,476 A * | 5/1988 | Russo | G05D 23/1927 165/265 |
| 4,751,961 A | 6/1988 | Levine et al. | |
| 4,897,798 A | 1/1990 | Cler | |
| 4,971,136 A | 11/1990 | Mathur et al. | |
| 5,088,645 A | 2/1992 | Bell | |
| 5,181,653 A * | 1/1993 | Foster | G05D 23/1934 165/205 |
| 5,211,332 A | 5/1993 | Adams | |
| 5,240,178 A | 8/1993 | Dewolf et al. | |
| 5,244,146 A | 9/1993 | Jefferson et al. | |
| 5,395,042 A | 3/1995 | Riley et al. | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,808,294 A | 9/1998 | Neumann | |
| 5,902,183 A | 5/1999 | D'Souza | |
| 5,909,378 A | 6/1999 | De Milleville | |
| 5,918,474 A | 7/1999 | Khanpara et al. | |
| 5,977,964 A | 11/1999 | Williams et al. | |
| 6,062,482 A | 5/2000 | Gauthier et al. | |
| 6,066,843 A | 5/2000 | Scheremeta | |
| 6,072,784 A | 6/2000 | Agrawal et al. | |
| 6,095,427 A | 8/2000 | Hoium et al. | |
| 6,098,893 A | 8/2000 | Berglund et al. | |
| 6,216,956 B1 | 4/2001 | Ehlers et al. | |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,415,205 B1 | 7/2002 | Myron et al. | |
| 6,478,233 B1 | 11/2002 | Shah | |
| 6,645,066 B2 | 11/2003 | Gutta et al. | |
| 6,769,482 B2 | 8/2004 | Wagner et al. | |
| 6,990,821 B2 | 1/2006 | Singh et al. | |
| 7,024,336 B2 | 4/2006 | Salsbury et al. | |
| 7,149,727 B1 | 12/2006 | Nicholls et al. | |
| 7,149,729 B2 | 12/2006 | Kaasten et al. | |
| 7,188,482 B2 | 3/2007 | Sadegh et al. | |
| 7,379,791 B2 | 5/2008 | Tamarkin et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,037,022 B2 | 10/2011 | Rahman et al. | |
| 8,090,477 B1 | 1/2012 | Steinberg | |
| 8,091,375 B2 | 1/2012 | Crawford | |
| 8,131,497 B2 | 3/2012 | Steinberg et al. | |
| 8,174,381 B2 | 5/2012 | Imes et al. | |
| 8,180,492 B2 | 5/2012 | Steinberg | |
| 8,219,249 B2 | 7/2012 | Harrod et al. | |
| 9,345,066 B2 * | 5/2016 | Aljabari | G01K 1/20 |
| 2004/0249479 A1 | 12/2004 | Shorrock | |
| 2005/0090915 A1 | 4/2005 | Geiwitz | |
| 2005/0128067 A1 | 6/2005 | Zakrewski | |
| 2005/0150968 A1 | 7/2005 | Shearer | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0165149 A1 * | 7/2006 | Kolk | G01K 1/20 374/1 |
| 2006/0186214 A1 | 8/2006 | Simon et al. | |
| 2006/0196953 A1 | 9/2006 | Simon et al. | |
| 2007/0045431 A1 | 3/2007 | Chapman, Jr. et al. | |
| 2007/0115902 A1 | 5/2007 | Shamoon et al. | |
| 2007/0205297 A1 | 9/2007 | Finkam et al. | |
| 2008/0015740 A1 | 1/2008 | Osann | |
| 2008/0015742 A1 | 1/2008 | Kulyk et al. | |
| 2008/0183335 A1 | 7/2008 | Poth et al. | |
| 2008/0191045 A1 | 8/2008 | Harter | |
| 2008/0273754 A1 | 11/2008 | Hick et al. | |
| 2008/0317292 A1 | 12/2008 | Baker et al. | |
| 2009/0171862 A1 | 7/2009 | Harrod et al. | |
| 2009/0254222 A1 | 10/2009 | Berman et al. | |
| 2009/0254225 A1 | 10/2009 | Boucher et al. | |
| 2009/0259713 A1 | 10/2009 | Blumrich et al. | |
| 2009/0297901 A1 | 12/2009 | Kilian et al. | |
| 2009/0327354 A1 | 12/2009 | Resnick et al. | |
| 2010/0019051 A1 | 1/2010 | Rosen | |
| 2010/0025483 A1 | 2/2010 | Hoeynck et al. | |
| 2010/0050004 A1 | 2/2010 | Hamilton, II et al. | |
| 2010/0070084 A1 | 3/2010 | Steinberg et al. | |
| 2010/0070086 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0167783 A1 | 7/2010 | Alameh et al. | |
| 2010/0179704 A1 | 7/2010 | Ozog | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0046792 A1 | 2/2011 | Imes et al. | |
| 2011/0046805 A1 | 2/2011 | Bedros et al. | |
| 2011/0046806 A1 | 2/2011 | Nagel et al. | |
| 2011/0077758 A1 | 3/2011 | Tran et al. | |
| 2011/0077896 A1 | 3/2011 | Steinberg et al. | |
| 2011/0151837 A1 | 6/2011 | Winbush, III | |
| 2011/0160913 A1 | 6/2011 | Parker et al. | |
| 2011/0185895 A1 | 8/2011 | Freen | |
| 2011/0290893 A1 * | 12/2011 | Steinberg | F24F 11/0034 236/49.3 |
| 2011/0307103 A1 | 12/2011 | Cheung et al. | |
| 2011/0307112 A1 | 12/2011 | Barrilleaux | |
| 2012/0017611 A1 | 1/2012 | Coffel et al. | |
| 2012/0065935 A1 | 3/2012 | Steinberg et al. | |
| 2012/0085831 A1 | 4/2012 | Kopp | |
| 2012/0101637 A1 | 4/2012 | Imes et al. | |
| 2012/0158350 A1 | 6/2012 | Steinberg et al. | |

(56) References Cited

U.S. PATENT DOCUMENTS

| | | | |
|---|---|---|---|
| 2012/0221151 A1 | 8/2012 | Steinberg | |
| 2012/0252430 A1 | 10/2012 | Imes et al. | |
| 2013/0173064 A1* | 7/2013 | Fadell | G05D 23/1902 700/276 |

FOREIGN PATENT DOCUMENTS

| | | |
|---|---|---|
| JP | 59106311 | 6/1984 |
| JP | 01252850 | 10/1989 |
| WO | 2012092627 | 7/2012 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
NetX RP32—WIFI Network Thermostat Consumer Brochure, Network Thermostat, May 2011, 2 pages.
NetX RP32—WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
International Application No. PCT/US2012/020088, International Preliminary Report on Patentability mailed on Jul. 2, 2013, 8 pages.
International Application No. PCT/US2012/020088, International Search Report & Written Opinion mailed on May 1, 2012, 9 pages.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.

\* cited by examiner

HVAC CONTROLLER CONFIGURATIONS THAT COMPENSATE FOR HEATING CAUSED BY DIRECT SUNLIGHT

CROSS-REFERENCES TO RELATED APPLICATIONS

This patent application is a continuation-in-part of U.S. Ser. No. 13/034,666 filed on Feb. 24, 2011, which claims the benefit of: U.S. Prov. Ser. No. 61/415,771 filed on Nov. 19, 2010 and U.S. Prov. Ser. No. 61/429,093 filed on Dec. 31, 2010. This application is also related to PCT/US12/20088 filed Jan. 3, 2012, and U.S. Prov. Ser. No. 61/627,996 filed on Oct. 21, 2011. PCT/US12/20088, U.S. Prov. Ser. No. 61/415,771, U.S. Prov. Ser. No. 61/429,093, and U.S. Prov. Ser. No. 61/627,996 are incorporated by reference herein.

TECHNICAL FIELD

This patent specification relates to systems and methods for the monitoring and control of energy-consuming systems or other resource-consuming systems. More particularly, this patent specification relates to control units that govern the operation of energy-consuming systems, household devices, or other resource-consuming systems, including methods for activating electronic displays for thermostats that govern the operation of heating, ventilation, and air conditioning (HVAC) systems.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

BRIEF SUMMARY OF THE INVENTION

In one embodiment, a thermostat may be presented. The thermostat may include a housing, a user interface, one or more temperature sensors, each of the one or more temperature sensors being configured to provide temperature sensor measurements, and a processing system disposed within the housing. The processing system may be configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature. The processing system may be configured to (i) determine time intervals in which direct sunlight is incident on the housing; (ii) during time intervals in which direct sunlight is not incident on the housing, process the temperature sensor measurements according to a first ambient temperature determination algorithm to compute the determined ambient temperature; and (iii) during time intervals in which it is determined that direct sunlight is incident on the housing, process the temperature sensor measurements according to a second ambient temperature determination algorithm to compute the determined ambient temperature.

The second ambient temperature determination algorithm may be characterized in that compensation is made for a heating of the thermostat caused by the direct sunlight that is incident on the housing.

In another embodiment, a method of compensating for direct sunlight heating in a thermostat may be presented. The method may include determining, using a processing system of the thermostat, time intervals in which direct sunlight is incident the thermostat. In some embodiments, the thermostat may include a housing, a user interface, and one or more temperature sensors, each of the one or more temperature sensors being configured to provide temperature sensor measurements. The processing system may be disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature. The method may also include, during time intervals in which direct sunlight is not incident on the thermostat, processing the temperature sensor measurements according to a first ambient temperature determination algorithm to compute the determined ambient temperature. The method may additionally include, during time intervals in which it is determined that direct sunlight is incident on the thermostat, processing the temperature sensor measurements according to a second ambient temperature determination algorithm to compute the determined ambient temperature, the second ambient temperature determination algorithm being characterized in that compensation is made for a heating of the thermostat caused by the direct sunlight that is incident on the thermostat.

In yet another embodiment, a method of compensating for sunlight heating a thermostat may be presented. The method may include processing temperature measurements from one or more temperature sensors. The method may also include computing a determined ambient temperature using the temperature measurements. The method may additionally include detecting that the determined ambient temperature is being affected by the sunlight heating the thermostat. The method may further include compensating for the sunlight heating the thermostat when calculating the determined ambient temperature while the determined ambient temperature is being affected by the sunlight heating the thermostat.

A further understanding of the nature and advantages of the present invention may be realized by reference to the remaining portions of the specification and the drawings. Also note that other embodiments may be described in the following disclosure and claims.

DETAILED DESCRIPTION OF THE INVENTION

Figure 1:
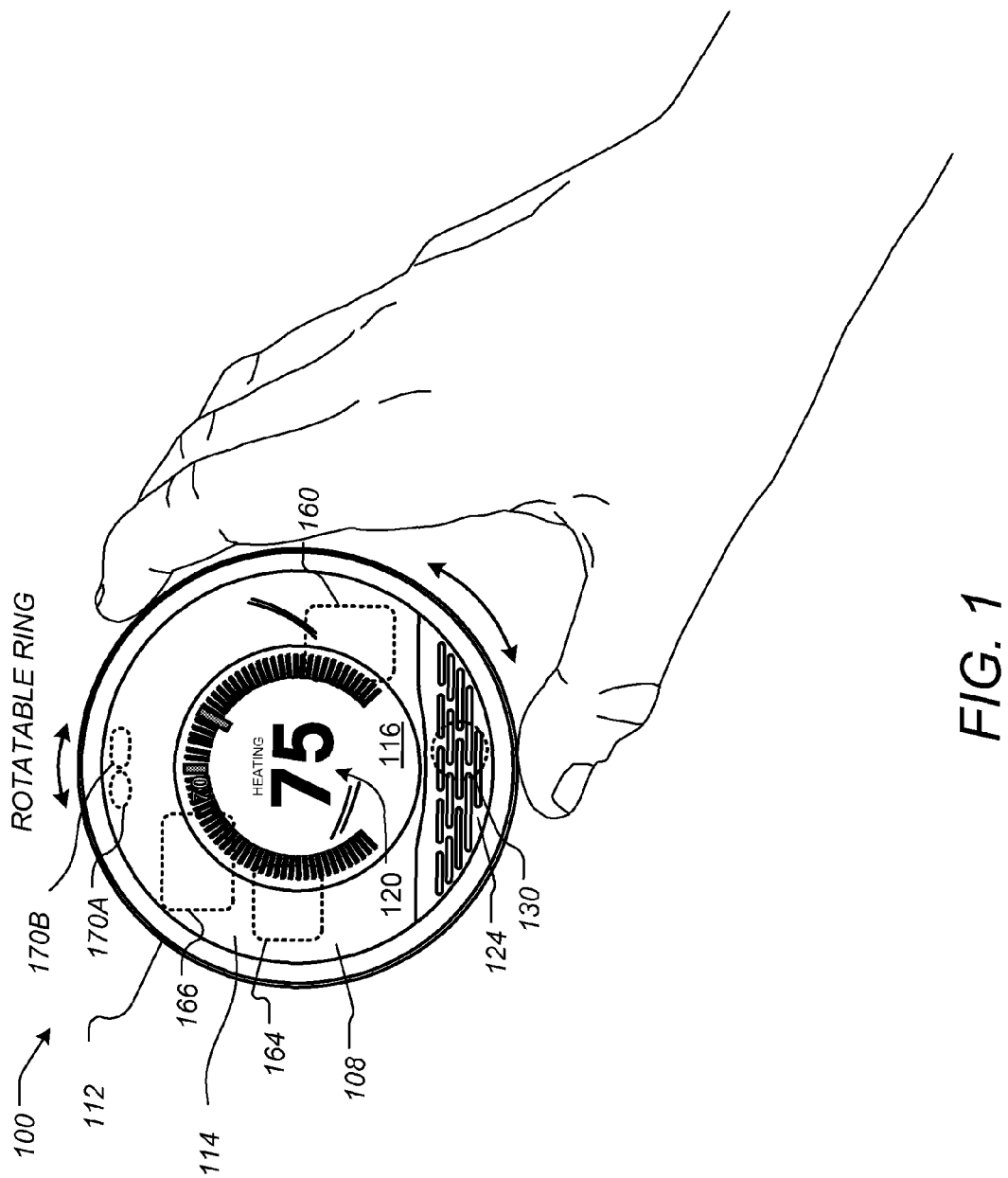
FIG. 1 illustrates a perspective view of a thermostat, according to one embodiment.

The subject matter of this patent specification relates to the subject matter of the following commonly assigned applications, each of which is incorporated by reference herein: U.S. Ser. No. 13/199,108 filed Aug. 17, 2011 (Ref. No. NES0054-US); International Application Ser. No. PCT/US12/00007 filed Jan. 3, 2012 (Ref. No. NES0190-PCT); and U.S. Ser. No. 13/624,881 filed Sep. 21, 2012 (Ref. No. NES0233-US). The above-referenced patent applications are collectively referenced herein as "the commonly-assigned incorporated applications."

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings, and industrial buildings. Further, it is to be appreciated that while the terms user, customer, installer, homeowner, occupant, guest, tenant, landlord, repair person, and/or the like may be used to refer to the person or persons who are interacting with the thermostat or other device or user interface in the context of one or more scenarios described herein, these references are by no means to be considered as limiting the scope of the present teachings with respect to the person or persons who are performing such actions.

Exemplary Thermostat Embodiments

Provided according to one or more embodiments are systems, methods, and computer program products for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, and easy to use. The term "thermostat" is used herein below to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments herein to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIGS. 1-5 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 1 illustrates a perspective view of a thermostat 100, according to one embodiment. In this specific embodiment, the thermostat 100 can be controlled by at least two types of user input, the first being a rotation of the outer ring 112, and the second being an inward push on an outer cap 108 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 100.

For this embodiment, the outer cap 108 can comprise an assembly that includes the outer ring 112, a cover 114, an electronic display 116, and a metallic portion 124. Each of these elements, or the combination of these elements, may be referred to as a "housing" for the thermostat 100. Simultaneously, each of these elements, or the combination of these elements, may also form a user interface. The user interface may specifically include the electronic display 116. In FIG. 1, the user interface 116 may be said to operate in an active display mode. The active display mode may include providing a backlight for the electronic display 116. In other embodiments, the active display mode may increase the intensity and/or light output of the electronic display 116 such that a user can easily see displayed settings of the thermostat 100, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 116, depending on the embodiment.

Depending on the settings of the thermostat 100, the active display mode and the inactive display mode of the electronic display 116 may also or instead be characterized by the relative power usage of each mode. In one embodiment, the active display mode may generally require substantially more electrical power than the inactive display mode. In some embodiments, different operating modes of the electronic display 116 may instead be characterized completely by their power usage. In these embodiments, the different operating modes of the electronic display 116 may be referred to as a first mode and a second mode, where the user interface requires more power when operating in the first mode than when operating in the second mode.

According to some embodiments the electronic display 116 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 116 may be a backlit color liquid crystal display (LCD). An example of information displayed on the electronic display 116 is illustrated in FIG. 1, and includes central numerals 120 that are representative of a current setpoint temperature. According to some embodiments, metallic portion 124 can have a number of slot-like openings so as to facilitate the use of a sensors 130, such as a passive infrared motion sensor (PIR), mounted beneath the slot-like openings.

According to some embodiments, the thermostat 100 can include additional components, such as a processing system 160, display driver 164, and a wireless communications system 166. The processing system 160 can adapted or configured to cause the display driver 164 to cause the electronic display 116 to display information to the user. The processing system 160 can also be configured to receive user input via the rotatable ring 112. These additional components, including the processing system 160, can be enclosed within the housing, as displayed in FIG. 1. These additional components are described in further detail herein below.

The processing system 160, according to some embodiments, is capable of carrying out the governance of the thermostat's operation. For example, processing system 160 can be further programmed and/or configured to maintain and update a thermodynamic model for the enclosure in which the HVAC system is installed. According to some embodiments, the wireless communications system 166 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy. According to some embodiments, occupancy information can be a used in generating an effective and efficient scheduled program. For example, an active proximity sensor 170A can be provided to detect an approaching user by infrared light reflection, and an ambient light sensor 170B can be provided to sense visible light. The proximity sensor 170A can be used in conjunction with a plurality of other sensors to detect proximity in the range of about one meter so that the thermostat 100 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 2:
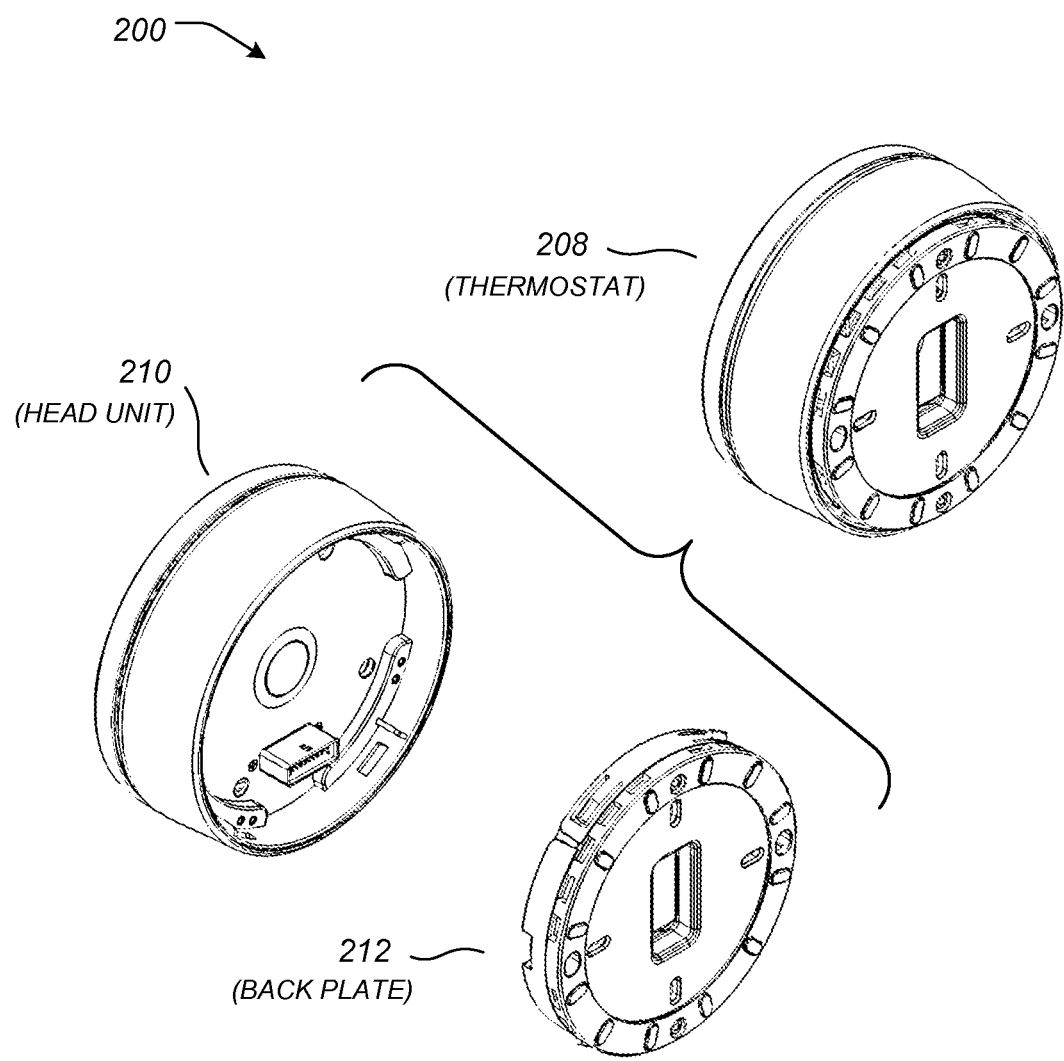
FIG. 2 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 2 illustrates an exploded perspective view 200 of a thermostat 208 having a head unit 210 and a backplate 212, according to one embodiment. Physically, this arrangement may be advantageous during an installation process. In this embodiment, the backplate 212 can first be attached to a wall, and the HVAC wires can be attached to a plurality of HVAC connectors on the backplate 212. Next, the head unit 210 can be connected to the backplate 212 in order to complete the installation of the thermostat 208.

Figure 3A:
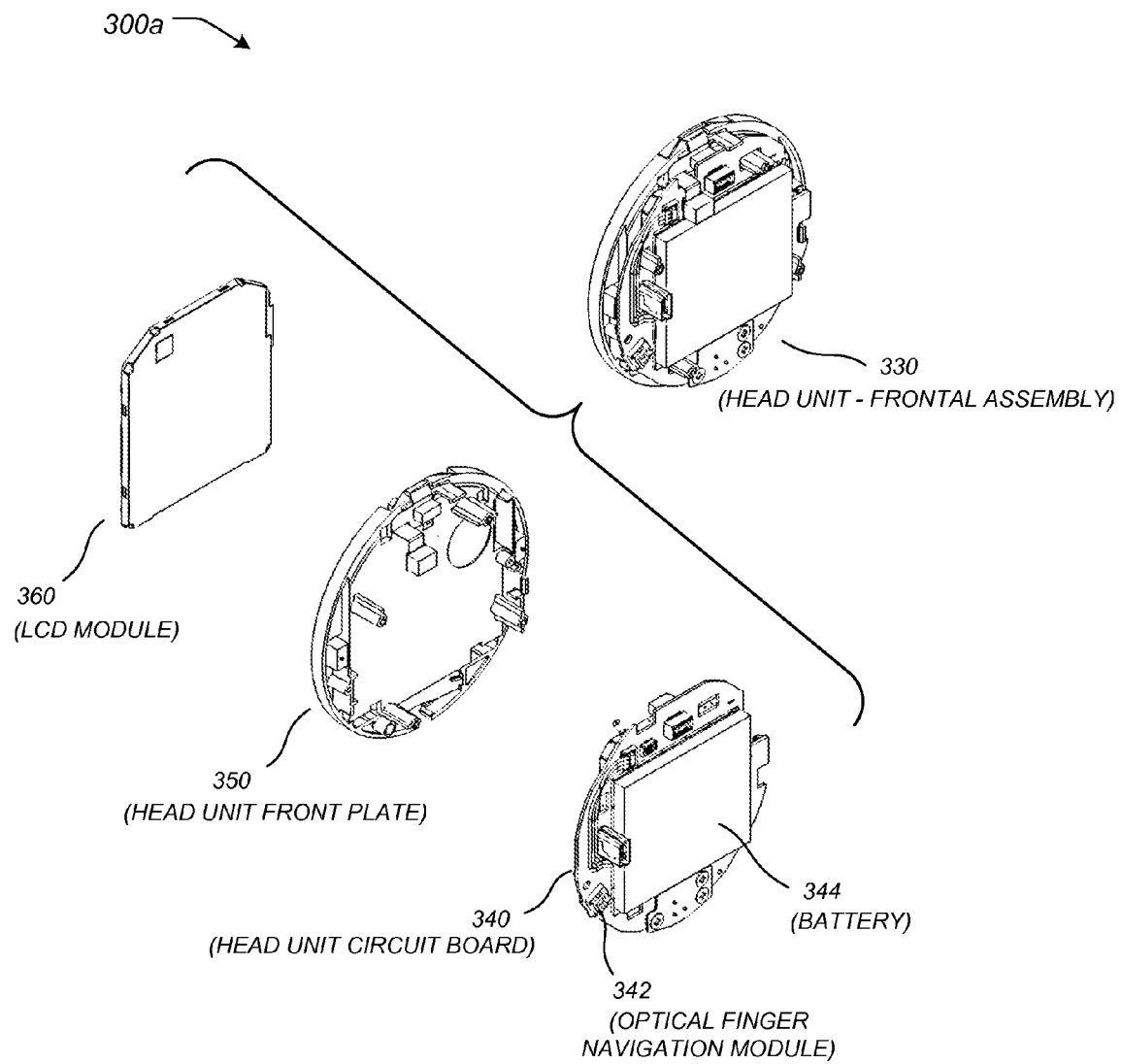
FIG. 3A illustrates an exploded perspective view of a head unit with respect to its primary components, according to one embodiment.

FIG. 3A illustrates an exploded perspective view 300a of a head unit 330 with respect to its primary components, according to one embodiment. Here, the head unit 330 may include an electronic display 360. According to this embodiment, the electronic display 360 may comprise an LCD module. Furthermore, the head unit 330 may include a mounting assembly 350 used to secure the primary components in a completely assembled head unit 330. The head unit 330 may further include a circuit board 340 that can be used to integrate various electronic components described further below. In this particular embodiment, the circuit board 340 of the head unit 330 can include a manipulation sensor 342 to detect user manipulations of the thermostat. In embodiments using a rotatable ring, the manipulation sensor 342 may comprise an optical finger navigation module as illustrated in FIG. 3A. A rechargeable battery 344 may also be included in the assembly of the head unit 330. In one preferred embodiment, rechargeable battery 344 can be a Lithium-Ion battery, which may have a nominal voltage of 3.7 volts and a nominal capacity of 560 mAh.

Figure 3B:
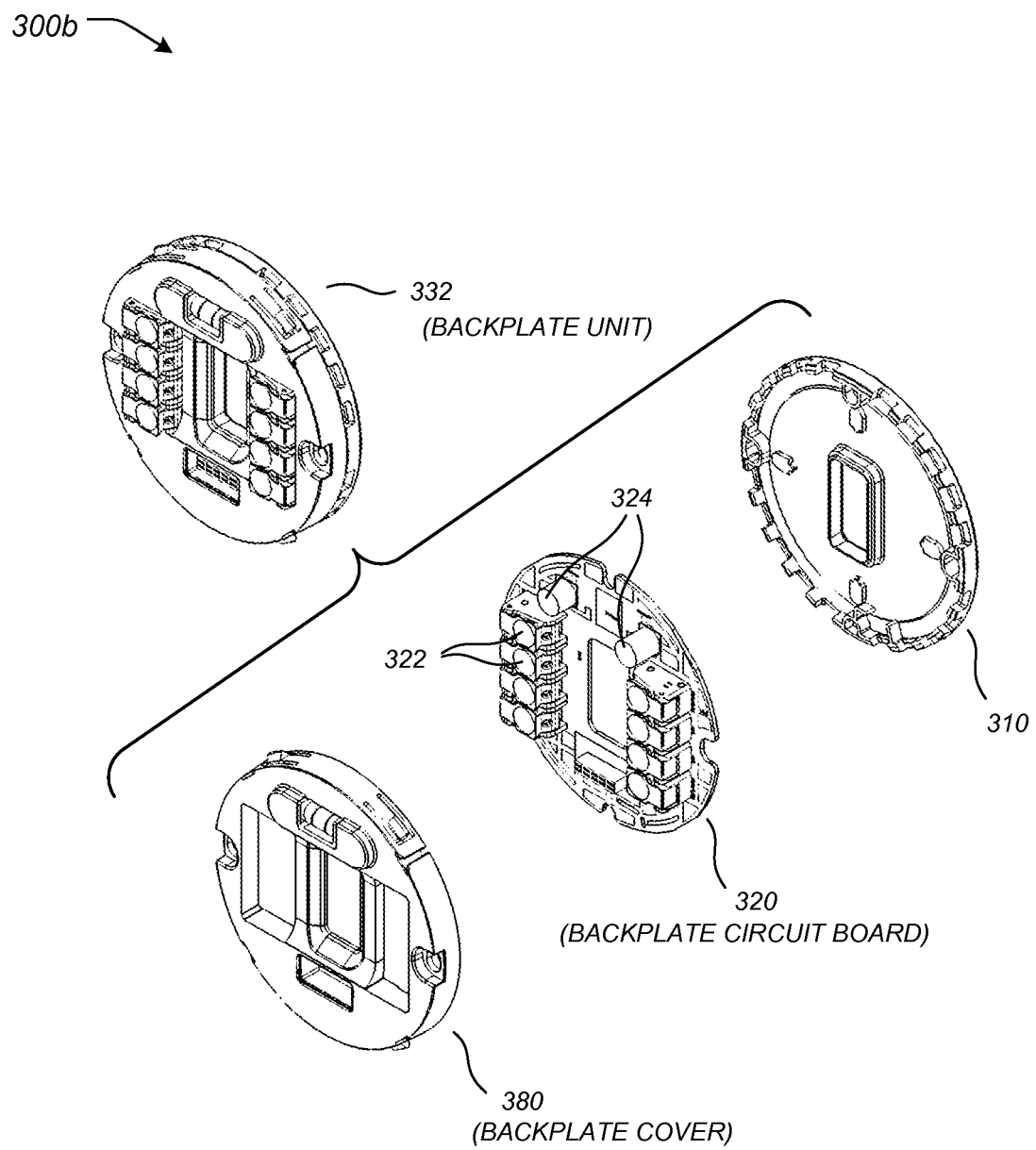
FIG. 3B illustrates an exploded perspective view of a backplate with respect to its primary components, according to one embodiment.

FIG. 3B illustrates an exploded perspective view 300b of a backplate 332 with respect to its primary components, according to one embodiment. The backplate 332 may include a frame 310 that can be used to mount, protect, or house a backplate circuit board 320. The backplate circuit board 320 may be used to mount electronic components, including one or more processing functions, and/or one or more HVAC wire connectors 322. The one or more HVAC wire connectors 322 may include integrated wire insertion sensing circuitry configured to determine whether or not a wire is mechanically and/or electrically connected to each of the one or more HVAC wire connectors 322. In this particular embodiment, two relatively large capacitors 324 are a part of power stealing circuitry that can be mounted to the backplate circuit board 320. The power stealing circuitry is discussed further herein below.

Figure 4A:
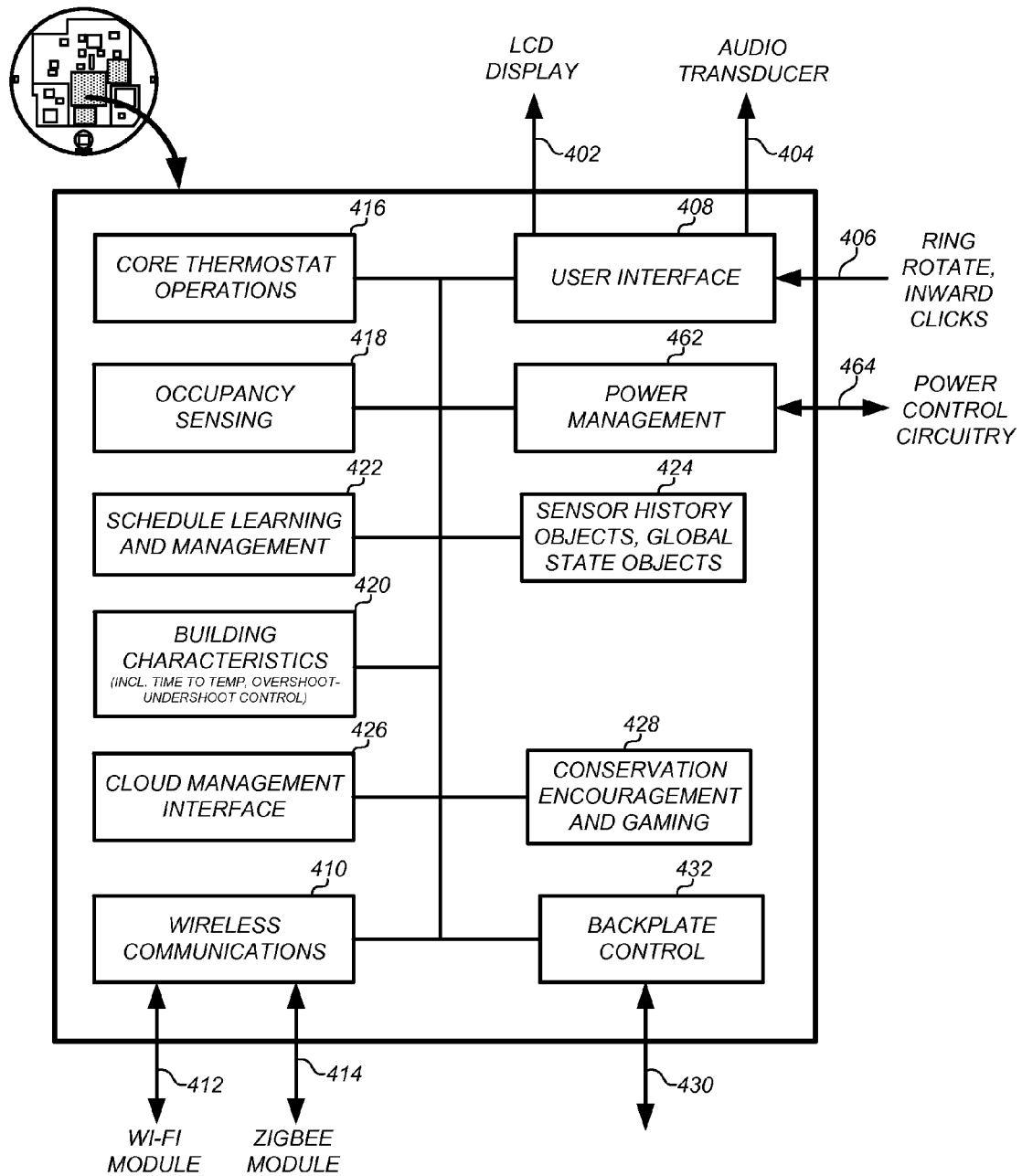
FIG. 4A illustrates a simplified functional block diagram for a head unit, according to one embodiment.

In addition to physical divisions within the thermostat that simplify installation process, the thermostat may also be divided functionally between the head unit and the backplate. FIG. 4A illustrates a simplified functional block diagram 400a for a head unit, according to one embodiment. The functions embodied by block diagram 400a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 402, an audio system 404, and a manipulation sensor 406 as a part of a user interface 408. The head unit processing function may also facilitate wireless communications 410 by interfacing with various wireless modules, such as a Wi-Fi module 412 and/or a ZigBee module 414. Furthermore, the head unit processing function may be configured to control the core thermostat operations 416, such as operating the HVAC system. The head unit processing function may further be configured to determine or sense occupancy 418 of a physical location, and to determine building characteristics 420 that can be used to determine time-to-temperature characteristics. Using the occupancy sensing 418, the processing function on the head unit may also be configured to learn and manage operational schedules 422, such as diurnal heat and cooling schedules. A power management module 462 may be used to interface with a corresponding power management module on the back plate, the rechargeable battery, and a power control circuit 464 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 424. The one or more memories may be integrated with the processing function, such as a flash memory or RAM memory available on many commercial microprocessors. The head unit processing function may also be configured to interface with a cloud management system 426, and may also operate to conserve energy wherever appropriate 428. An interface 432 to a backplate processing function 430 may also be included, and may be implemented using a hardware connector.

Figure 4B:
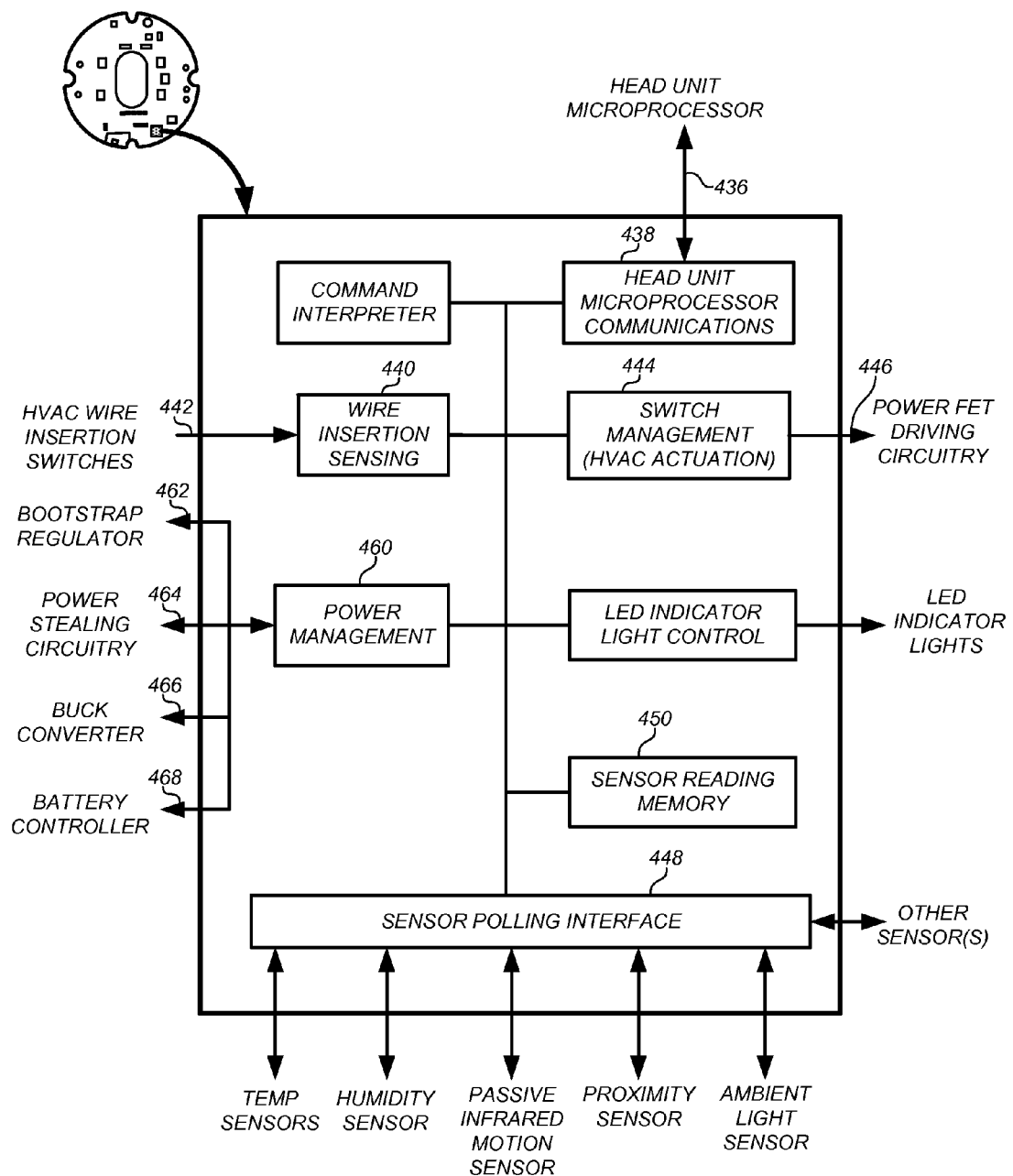
FIG. 4B illustrates a simplified functional block diagram for a backplate, according to one embodiment.

FIG. 4B illustrates a simplified functional block diagram for a backplate, according to one embodiment. Using an interface 436 that is matched to the interface 432 shown in FIG. 4A, the backplate processing function can communicate with the head unit processing function 438. The backplate processing function can include wire insertion sensing 440 that is coupled to external circuitry 442 configured to provide signals based on different wire connection states.

The backplate processing function may be configured to manage the HVAC switch actuation 444 by driving power FET circuitry 446 to control the HVAC system.

The backplate processing function may also include a sensor polling interface 448 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 448 may be communicatively coupled to a sensor reading memory 450. The sensor reading memory 450 can store sensor readings and may be located internally or externally to a microcontroller or microprocessor.

Finally, the backplate processing function can include a power management unit 460 that is used to control various digital and/or analog components integrated with the backplate and used to manage the power system of the thermostat. Although one having skill in the art will recognize many different implementations of a power management system, the power management system of this particular embodiment can include a bootstrap regulator 462, a power stealing circuit 464, a buck converter 466, and/or a battery controller 468.

Figure 5:
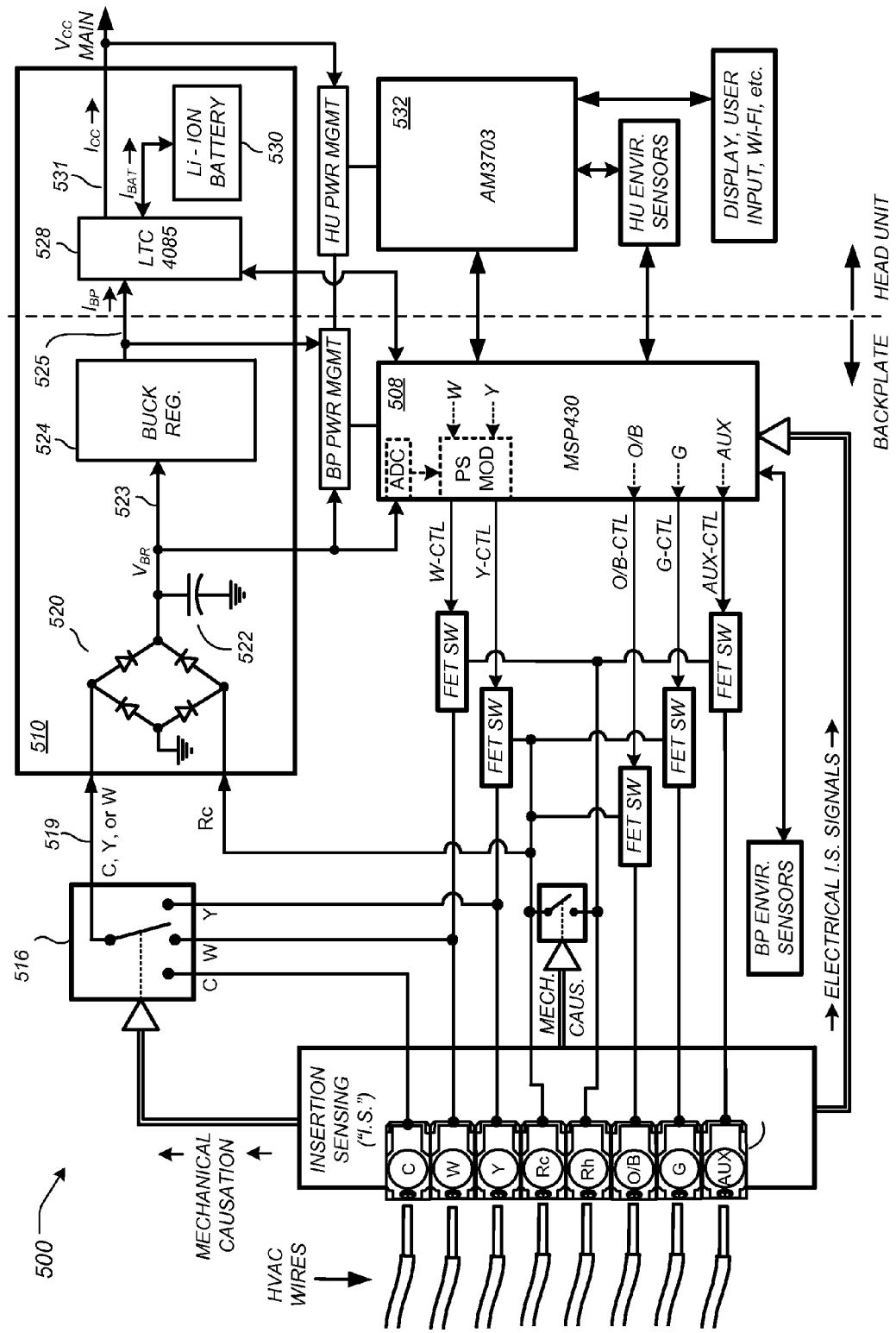
FIG. 5 illustrates a simplified circuit diagram of a system for managing the power consumed by a thermostat, according to one embodiment.

FIG. 5 illustrates a simplified circuit diagram 500 of a system for managing the power consumed by a thermostat, according to one embodiment. The powering circuitry 510 comprises a full-wave bridge rectifier 520, a storage and waveform-smoothing bridge output capacitor 522 (which can be, for example, on the order of 30 microfarads), a buck regulator circuit 524, a power-and-battery (PAB) regulation circuit 528, and a rechargeable lithium-ion battery 530. In conjunction with other control circuitry including backplate power management circuitry 527, head unit power management circuitry 529, and the microcontroller 508, the powering circuitry 510 can be configured and adapted to have the characteristics and functionality described herein below.

By virtue of the configuration illustrated in FIG. 5, when there is a "C" wire presented upon installation, the powering circuitry 510 operates as a relatively high-powered, rechargeable-battery-assisted AC-to-DC converting power supply. When there is not a "C" wire presented, the powering circuitry 510 operates as a power-stealing, rechargeable-battery-assisted AC-to-DC converting power supply. The powering circuitry 510 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 510 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 510 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 530. In other words, when the thermostat is engaged in operations, such as when the electronic display is in an active display mode, power may be supplied by both power stealing and the rechargeable battery 530. In order to preserve the power stored in the rechargeable battery 530, and to give the rechargeable battery 530 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 530. In this embodiment, the backplate processing function 508 (MSP430) can be configured to monitor the environmental sensors in a low-power mode, and then wake the head unit processing function 532 (AM3703) when needed to control the HVAC system, etc. Similarly, the backplate processing function 508 can be used to monitor sensors used to detect the closeness of a user, and wake the head unit processing system 532 and/or the electronic display when it is determined that a user intends to interface with the thermostat.

It will be understood by one having skill in the art that the various thermostat embodiments depicted and described in relation to FIGS. 1-5 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Sunlight Correction Configurations

One issue that can arise in relation to the thermostatic control of an HVAC system for many homes and businesses (hereinafter "enclosures") relates to scenarios in which, due to the particular placement of the thermostat in the enclosure relative to windows, skylights, or other structural features that allow sunlight to shine into the enclosure, the thermostat may be exposed to direct sunlight during some part of the day. When so exposed, it can often happen that the thermostat body heats up, along with the ambient temperature in the vicinity of the thermostat, and causes the thermostat to perceive a sensed ambient temperature for the air in the enclosure that is significantly higher than the actual ambient air temperature in the enclosure. Because the thermostat "thinks" that that the enclosure is hotter than it really is, the thermostat controls the HVAC system to make or allow the enclosure to become colder than it would otherwise become. This can cause occupant discomfort in the wintertime due to insufficient heating, and furthermore can cause both occupant discomfort and wasted energy in the summertime due to excessive cooling.

The embodiments herein may be directed towards compensating for direct sunlight incident upon the thermostat. Direct sunlight exposure can occur for periods of several hours per day, and can cause a determined ambient temperature calculated by a processing system of the thermostat to be artificially increased by up to 20 degrees. In some embodiments, the temperature measurements received from two temperature sensors in the thermostat may be used to calculate a determined ambient temperature during normal operation. During time intervals where direct sunlight is incident upon the thermostat, one or both of these temperature sensors may be heated by the sunlight, thereby distorting the calculation of the determined ambient temperature.

One way to solve this problem is to detect hours during the day when direct sunlight is incident on the thermostat, and then use a different method of computing the determined ambient temperature during those times. The different method of computing the determined ambient temperature may use different equations, different calculations, and/or different or additional temperature sensors. For example, a third temperature sensor may be added to the thermostat on the bottom of the backplate. The third temperature sensor may be less susceptible to heating by direct sunlight and may generally track the ambient enclosure temperature according to an arithmetic offset.

Some embodiments of the thermostat may also include an ambient light sensor (ALS) that can be used to detect periods of direct sunlight. When direct sunlight is detected on the thermostat, the thermostat can switch between temperature sensors and/or equations that are used to calculate the determined ambient temperature. When sunlight is not incident on the thermostat, the ambient temperature can be calculated as a function of two temperature sensors, with the first temperature sensor being disposed closer to the housing of the thermostat than the second temperature sensor, and the second temperature sensor being disposed closer to the internal electronics of the thermostat than the first temperature sensor. In contrast, when sunlight is incident on the thermostat, the ambient temperature can be calculated as a function of the third temperature sensor and an offset calculated using historical data.

In order to reduce false positives and false negatives, an ambient light profile may be constructed using periodic ALS readings throughout a 24-hour cycle. The ambient light profile may be used to identify time intervals during the day when direct sunlight events are most probable. The ambient light profile may also be used to calibrate an internal schedule for sunrise and sunset times. At night, the sunlight compensation algorithm can be turned off in order to save power and avoid any false positives. The ambient light profile may also be used to determine thresholds that may be used in real time to detect direct sunlight incident on the thermostat.

When operating during the day, the thermostat can detect when the ambient light measurements exceed the thresholds determined by the ambient light profile. The thresholds may be lowered during time intervals when the ambient light profile predicts direct sunlight events, and raised otherwise in order to reduce false positives and negatives. After detecting direct sunlight using the ALS, the thermostat can then detect when a temperature increase exceeds a threshold. The combination of ALS and temperature sensor readings can verify that the thermostat is being heated by direct sunlight and not merely incident to a high-power artificial light source that would not heat the thermostat. In order to smooth the transition between temperature calculation algorithms, a low pass filter operation may be used on the calculated temperature, such as a sliding window averaging the last few measurements.

The concepts described in this disclosure may be broadly applied to any circumstance where intermittent environmental anomalies give reason to distrust techniques used to monitor environmental sensors during normal operation. Specifically, the idea of generating a profile that can predict when environmental anomalies are most likely to occur and adjusting threshold values during these time intervals can reduce false positives and negatives. Generally, environmental anomalies might not be measured correctly by systems using only a single threshold.

Other applications might include a smoke detector that raises its thresholds when dinner is being cooked, when someone is in the shower, when someone is smoking cigarettes, or during other predictable times when non-fire events might occur. Home security systems could lower sensor thresholds during times when occupants are known to be permissibly in the house. Temperature sensors in a refrigerator could be calibrated to compensate for meal times when people are likely to open the refrigerator door often. On a broader scale, data could be reported to a central server from a number of sensor units installed in many different homes. This data could be used to generate sensor profiles for similar regions of the country and automatically adjust sensor thresholds from a central location as the country-wide profile is updated in real time.

Figure 6:
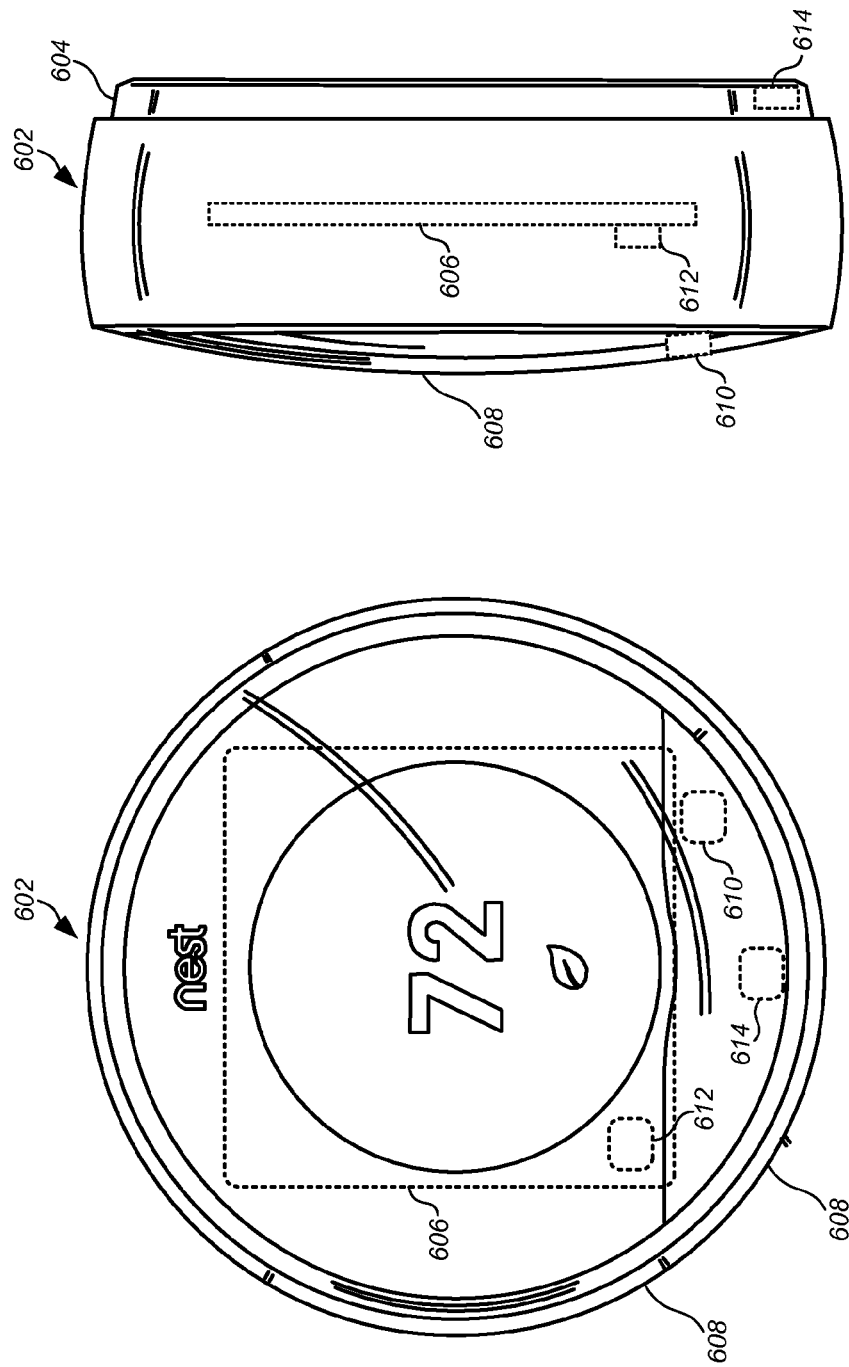
FIG. 6 illustrates various views of a thermostat having one or more temperature sensors, according to some embodiments.

FIG. 6 illustrates various views of a thermostat having one or more temperature sensors, according to some embodiments. Note that the embodiment of FIG. 6 is merely exemplary. Other embodiments may include more or fewer temperature sensors, and the temperature sensors may be disposed in different locations and/or orientations within the housing of the thermostat. This particular embodiment includes three distinct temperature sensors. A first temperature sensor 610 may be disposed near a housing 608 of the thermostat 602. In one embodiment, the first temperature sensor 610 may be affixed to an internal portion of the housing 608. In some embodiments, the first temperature sensor 610 may be disposed within the housing 608 such that it is near a front portion of the thermostat 602, near a user interface of the thermostat 602, and/or relatively farther away from internal heat sources of the thermostat 602, such as a processing system, microprocessors, high-power sensors, and/or the like.

The positioning of the first temperature sensor 610 may be relative to a second temperature sensor 612. In some embodiments, the second temperature sensor 612 may be disposed on a circuit board internal to the thermostat 602. In the exemplary thermostat described above, a circuit board 606 in the head unit may be a suitable location to mount the second temperature sensor 612. The second temperature sensor 612 may also be referred to as a head unit temperature sensor. The first temperature sensor 610 may be disposed closer to the housing 608 of the thermostat 602 and the second temperature sensor 612. The second temperature sensor 612 may be disposed closer to the internal electronics of the thermostat 602 than the first temperature sensor 610.

The first temperature sensor 610 and the second temperature sensor 612 may also be characterized by how they are affected by external temperature changes. The first temperature sensor 610 may respond more quickly to ambient temperature changes in the enclosure than the second temperature sensor 612. The first temperature sensor 610 may also respond more quickly to heating caused by direct sunlight incident on the housing 608 of the thermostat 602 than the second temperature sensor 612. In some cases, the first temperature sensor 610 may be described as being more linked to the external housing and the environment of the enclosure, while the second temperature sensor 612 may be described as being less linked to the external housing, but more linked to the internal heat-generating components of the thermostat.

Generally, the thermostat 602 does not simply accept raw temperature measurements provided by the one or more temperature sensors as an accurate representation of the ambient temperature in the enclosure. In some cases, the one or more temperature sensors may be disposed within the housing 608 of the thermostat 602, and may therefore be somewhat thermally insulated from the ambient temperature in the enclosure. The one or more temperature sensors may also be affected by heat generated by internal electronic components of the thermostat 602. Microprocessors, microcontrollers, power sources, power regulating circuitry, power stealing circuitry, wireless communications circuitry, and user interface circuitry may all generate varying amounts of heat during operation of the thermostat 602. Because each of the one or more thermostats may be disposed at varying distances from the heat-generating components, the raw temperature sensor measurements may generally be higher than the actual ambient temperature of the enclosure.

Therefore, instead of using temperature sensor measurements provided by the one or more temperature sensors, the thermostat 602 may instead calculate a determined ambient temperature. As used herein, the term "determined ambient temperature" may refer to a temperature that determined by a processing system of the thermostat 602 as a function of the temperature sensor measurements provided by the one or more temperature sensors. For example, the determined ambient temperature may be calculated by comparing the measurements from the first temperature sensor to the measurements from the second temperature sensor, or by adding an offset to measurements from one of the one or more temperature sensors.

During time intervals in which direct sunlight is not incident on the housing 608 of the thermostat 602, a first ambient temperature determination algorithm may be used to compute the determined ambient temperature. This first algorithm may leverage the fact that the first temperature sensor 610 and the second temperature sensor 612 may be affected differently by the heat-generating components of the thermostat 602. In one embodiment, the first algorithm may calculate the determined ambient temperature using the following equation.

$$T_{det} = T_1 - k \cdot (T_2 - T_1) \quad (1)$$

In equation (1), $T_{det}$ represents the determined ambient temperature, $T_1$ represents the temperature sensor measurements provided by the first temperature sensor 610, $T_2$ represents the temperature sensor measurements provided by the second temperature sensor 612, and k represents a constant that may depend on the characteristics of the thermostat 602 and/or the enclosure. In one embodiment, the value of k may be approximately 1.0.

The equations and methods described above may be used to calculate the determined ambient temperature using at least two temperature sensors. Other embodiments may alter equation (1) to include additional temperature sensors. Generally, equation (1) may provide an accurate estimation of the ambient temperature of the enclosure during normal operation. However, situations have been discovered where this first ambient temperature determination algorithm is not adequate. One such situation involves times when the thermostat is exposed to direct sunlight.

When the thermostat is exposed to direct sunlight, the first temperature sensor 610 may be exposed to direct sunlight, or alternatively, the housing 608 of the thermostat 602 to which the first temperature sensor 610 may be affixed may be exposed to direct sunlight. The heat generated by the sunlight absorbed by the housing 608 may be readily transferred to the first temperature sensor 610 by heating the housing 608 or by heating the internal environment of the thermostat 602. In this case, the first temperature sensor 610 may be heated above the ambient temperature by both the internal electronics of the thermostat as well as the external heating by direct sunlight. If the first ambient temperature determination algorithm is still used in a direct sunlight situation, the determined ambient temperature will generally be higher than the actual ambient temperature of the enclosure.

When exposed to direct sunlight, the first temperature sensor 610 tends to heat before the sunlight exposure begins to affect the second temperature sensor 612. Additionally, the first temperature sensor 610 will tend to heat at a faster rate than the second temperature sensor 612. In other words, the slope of the temperature measurements provided over time by the first temperature sensor 610 will be steeper than the temperature measurements provided over time by the second temperature sensor 612 when the thermostat is exposed to direct sunlight. According to equation (1) the determined ambient temperature is a function of the difference between the first temperature sensor 610 and the second temperature sensor 612. As this difference is artificially increased by direct sunlight exposure, the determined ambient temperature may climb at an even faster rate than that of the first temperature sensor 610.

To overcome the problem of direct sunlight, some embodiments described herein may incorporate a third temperature sensor 614 into the design of the thermostat 602. The third temperature sensor 614 may be added to a portion of the thermostat 602 that is somewhat thermally isolated from the influence of the direct sunlight compared to the other sensors. In this particular embodiment, the third temperature sensor 614 may be added to the backplate 604 of the thermostat 602. The third temperature sensor 614 may be disposed towards the bottom of the backplate 604, as it has been determined that internally generated heat rises away from the bottom of the thermostat 602. In some embodiments, insulating materials may also be incorporated into or around the backplate sensor 614 in order to make the backplate sensor 614 respond the slowest to direct sunlight effects out of the three temperature sensors.

In some embodiments, the third temperature sensor 614 may be less sensitive than the second temperature sensor 612 and/or the first temperature sensor 610. In one embodiment, the third temperature sensor 614 may be combined with a humidity sensor in the same integrated circuit. The reduced sensitivity of the third temperature sensor 614 may be advantageous in that it prevents the third temperature sensor 614 from responding immediately to direct sunlight heating. The third temperature sensor 614 may also be used as a backup sensor in the case of a malfunctioning first temperature sensor 610 and/or second temperature sensor 612. The third temperature sensor 614 may also be used in cases where the head unit 606 is separated from the backplate 604. In some embodiments, the third temperature sensor 614 may also be used to monitor heat generated by the internal electronics of the backplate 604.

Many different types of commercially available sensors may be used to implement the various temperature sensors used by the thermostat. Merely by way of example, the first temperature sensor and/or the second temperature sensor may be implemented using the TMP112 high-precision, low-power, digital temperature sensor available from Texas Instruments®. The third temperature sensor may be implemented using the SHT20 digital humidity sensor chip available from Sensirion®.

Figure 7:
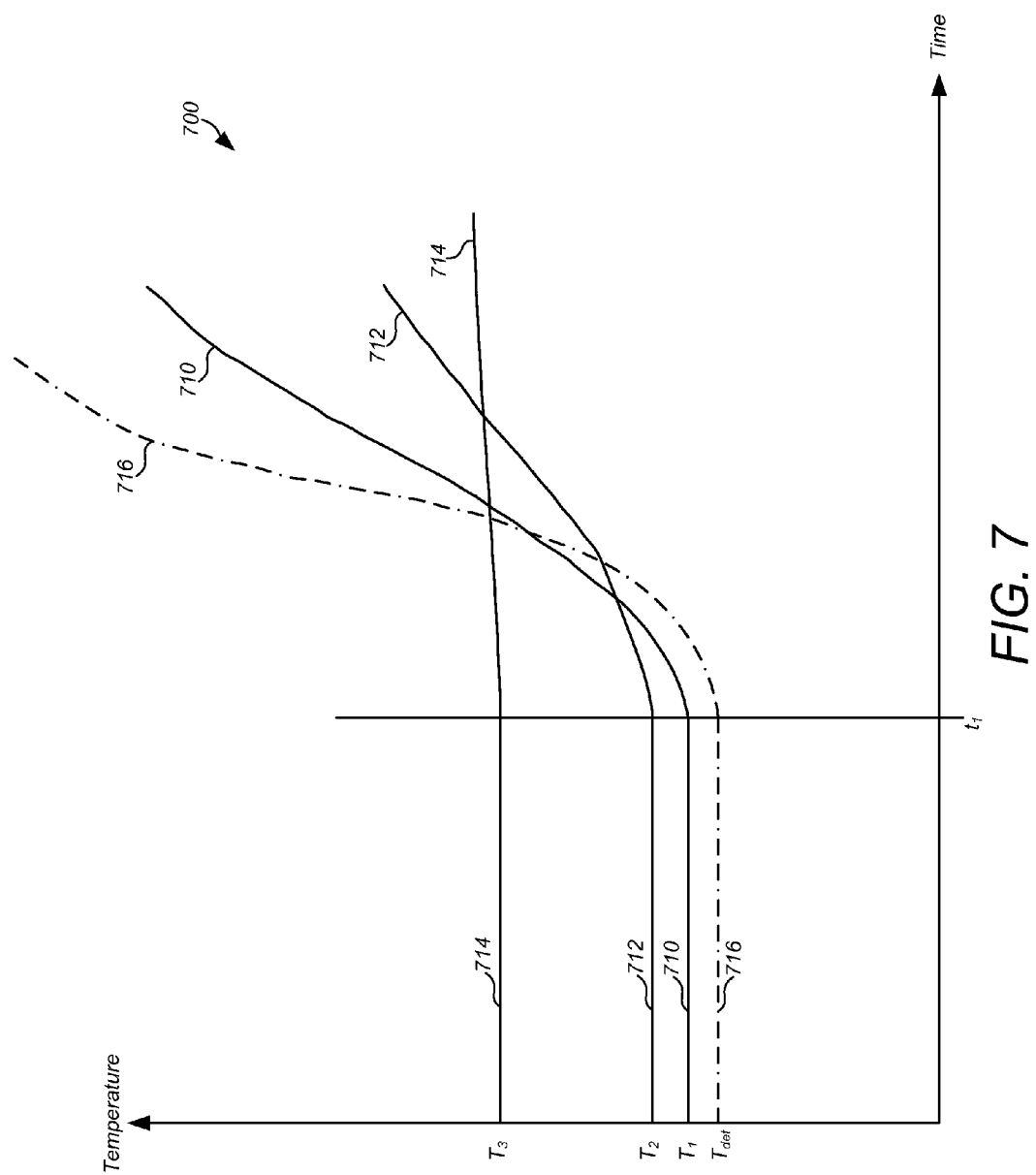
FIG. 7 illustrates a graph of the responses of three temperature sensors when the thermostat is exposed to direct sunlight, according to some embodiments.

FIG. 7 illustrates a graph 700 of the responses of three temperature sensors when the thermostat is exposed to direct sunlight, according to some embodiments. The temperature measurements provided on graph 700 may correspond to the three temperature sensors described above. Specifically, curve 714 may represent temperature measurements provided over time by the third temperature sensor 614, curve 712 may represent temperature measurements provided over time by the second temperature sensor 612, and curve 710 may represent temperature measurements provided over time by the first temperature sensor 610. Curve 716 may represent the determined ambient temperature as calculated by the first temperature determination algorithm. For example, curve 716 may be generated using equation (1) as a function of $T_1$ and $T_2$.

Prior to time $t_1$, the determined ambient temperature curve 716 may be less than any of the temperature sensor measurements provided by any of the one or more temperature sensors. Generally, the more isolated the particular temperature sensor is from the ambient temperature of the enclosure, the warmer the steady-state measured temperature of the particular temperature sensor will be. Therefore, the third temperature sensor curve 714 will generally be higher than the second temperature sensor curve 712, which will also be higher than the first temperature sensor curve 710 during steady-state conditions.

At time $t_1$, it may be assumed that the temperature sensors of the thermostat begin to respond to direct sunlight that becomes incident upon the housing of the thermostat. Generally, the temperature sensors may begin to respond at times and at rates that are related to their thermal isolation from the heating effects of the direct sunlight. For example, the first temperature sensor curve 710 may begin to rise first and at the fastest rate. Next, the second temperature sensor curve 712 may begin to rise at a time later than that of the first temperature sensor curve 710 and at a slower rate than that of the first temperature sensor curve 710. Similarly, the third temperature sensor curve 714 may begin to rise a later time than that of the second temperature sensor curve 712 and at a slower rate than that of the second temperature sensor curve 712.

The effects upon the determined ambient temperature curve 716 that is computed by the first ambient temperature determination algorithm may be even more pronounced. As the difference between the first temperature sensor curve 710 and the second temperature sensor curve 712 increases, the slope of the determined ambient temperature curve 716 may increase at an even more dramatic rate. As illustrated by FIG. 7, because of the varying effects upon the temperature sensors of the thermostat, the first ambient temperature determination algorithm may calculate a determined ambient temperature that is far above the actual ambient temperature of the enclosure.

In some cases, actual data has shown that direct sunlight effects can corrupt the temperature calculations by as much as 10 to 20 degrees. This miscalculation has the potential to dramatically affect the HVAC system operation in financially important ways. For example, during the summer, temperature miscalculation may cause a dramatic increase in the usage of a home's air conditioner. Air conditioning in hot or humid climates represents one of the most costly monthly bills for homeowners. In the winter, the consequences may be even more severe. Heating by direct sunlight may cause the temperature in the house to drop dramatically. When the thermostat is no longer influenced by direct sunlight, the thermostat may need to activate a home's primary heating system, as well as secondary and two-stage heating systems, such as radiators, radiant flooring, heat pumps, and/or the like. Time-to-temperature algorithms operating within an advanced thermostat may determine that the difference between the actual temperature and the setpoint temperature is great enough that both primary and secondary heating sources may need to be activated. This may cause dangerous or costly conditions for a home owner.

At a time near time $t_1$, the thermostat may determine that direct sunlight is heating the thermostat. In response, the thermostat may switch between ambient temperature determination algorithms. In some embodiments, a second ambient temperature determination algorithm may be used during time intervals when the thermostat determines that direct sunlight is heating the thermostat and causing the determined ambient temperature calculated by the first ambient temperature determination algorithm to become unreliable.

As may also be observed in FIG. 7, the third temperature sensor curve 714 is not rapidly affected by the exposure to direct sunlight. As described above, the third temperature sensor 614 may be disposed within the thermostat such that it is more thermally isolated from the effects of direct sunlight heating than the other temperature sensors. In one embodiment, the stability exhibited by the third temperature sensor 614 may be used by the second ambient temperature determination algorithm to calculate the determined ambient temperature.

Figure 8:
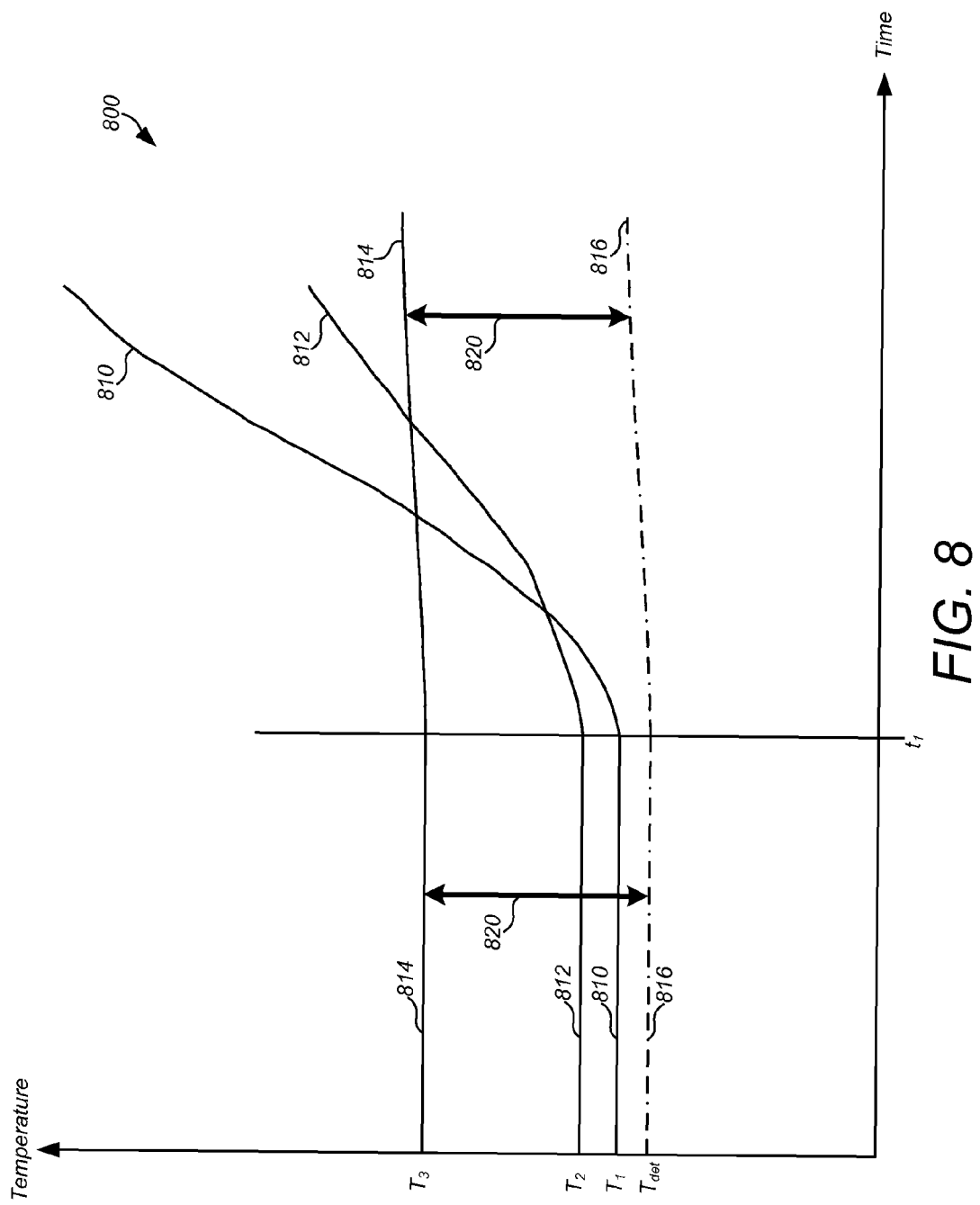
FIG. 8 illustrates a graph of the responses of three temperature sensors when the thermostat is exposed to direct sunlight, according to some embodiments.

FIG. 8 illustrates a graph 800 of the responses of three temperature sensors when the thermostat is exposed to direct sunlight, according to some embodiments. Curve 814 may represent temperature measurements provided over time by the third temperature sensor 614, curve 812 may represent temperature measurements provided over time by the second temperature sensor 612, and curve 810 may represent temperature measurements provided over time by the first temperature sensor 610. Curve 816 may represent the determined ambient temperature as calculated by the second temperature determination algorithm.

In some embodiments, a relationship between the third temperature sensor curve 814 and the determined ambient temperature curve 816 may be observed during time intervals where direct sunlight is not heating the thermostat. During these intervals, the determined ambient temperature may be calculated using the first ambient temperature determination algorithm that need not depend on the third temperature sensor. For example, an offset temperature 820 may be measured during these intervals and stored by the thermostat. Using historical data, the offset temperature 820 may be calculated using the following equation.

$$T_{offset} = T_3 - T_{det} \quad (2)$$

During normal operations, it has been observed that the actual temperature may track the temperature measured by the third temperature sensor. In one embodiment, the offset temperature 820 may be calculated using historical values for the determined ambient temperature and measurements provided by the third temperature sensor over a time interval of approximately 30 minutes prior to detecting direct sunlight incident on the thermostat. Other embodiments may use other time interval lengths, such as approximately 10 minutes, 25 minutes, 35 minutes, and 1 hour. At a time near time $t_1$, the thermostat may determine that direct sunlight is heating the thermostat and switch to the second ambient temperature determination algorithm. In one embodiment where the offset temperature 820 has been determined, the second ambient temperature determination algorithm may calculate the determined ambient temperature using the following equation.

$$T_{det} = T_3 - T_{offset} \quad (3)$$

Therefore, the second ambient temperature determination algorithm may be configured to leverage the slower response of the third temperature sensor to direct sunlight heating effects. The first ambient temperature determination algorithm may be ideal during non-sunlight operation because it can respond quickly to temperature changes (e.g. someone leaves a door open in the winter); however, this ability to rapidly respond may be a detriment during direct sunlight operation. Instead, in the embodiment described above, an arithmetic offset temperature may be subtracted from the temperature sensor measurements provided by the third temperature sensor. In other embodiments, scaling factors may be used, percentages may be calculated, and other combinations of sensors may also be used. In one embodiment, a difference between the second temperature sensor and the third temperature sensor may be used by the second ambient temperature determination algorithm. In another embodiment, measurements from all three sensors may be used to calculate the determined ambient temperature. Additional equations and combinations of temperature sensors may be derived using the principles of this disclosure to meet the needs of many different enclosures and thermostat types. The equations described above are merely exemplary, and not meant to be limiting.

While some embodiments may simply switch between the first and second ambient temperature determination algorithms when direct sunlight is incident on the thermostat housing, other embodiments may use additional sensors and algorithms to further refine the time when this switching should take place in order to minimize false negatives and false positives that may be caused by only temporary direct sunlight exposure and other artificial light sources.

In order to further detect and compensate for direct sunlight heating effects, some embodiments may also include an ambient light sensor (ALS). In some cases, the ALS may have a dynamic sensitivity range such that the output will not saturate when receiving energy associated with direct sunlight. The ALS may be in operative communication with a processing system of the thermostat. The processing system may be configured to receive ambient light measurements from the ALS in order to determine time intervals in which direct sunlight is incident on housing of the thermostat.

Ambient light measurements from the ALS may be recorded over time in order to generate an ALS profile of the enclosure in which the thermostat is installed. The ALS profile may be used to predict time intervals in which direct sunlight is most likely to be incident on the thermostat housing. By determining time intervals that are most likely to include direct sunlight events, the processing system of the thermostat may adjust temperature and/or ambient light thresholds in order to more accurately determine a proper switching point between the first algorithm and the second algorithm for calculating the determined ambient temperature.

Many different types of commercially available sensors may be used to implement the ALS. Merely by way of example, the ALS may be implemented using the Si114x family of proximity and ambient light sensor ICs available from Silicon Labs®, such as the Si1142 chip. The ALS may also be implemented using the TSL2571 light-to-digital converter chip available from Texas Advanced Optoelectronic Solutions®.

Figure 9:
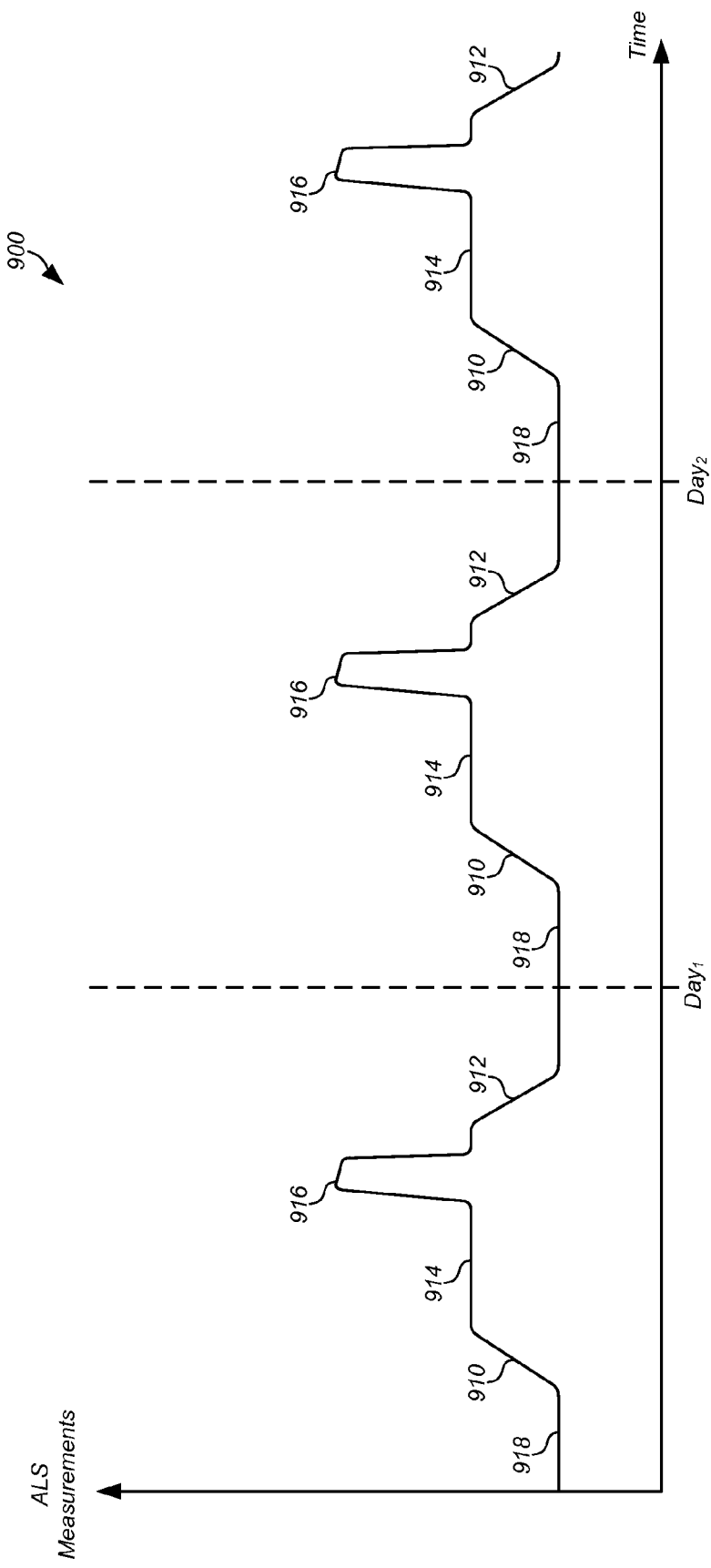
FIG. 9 illustrates a graph of ambient light measurements recorded over multiple days, according to some embodiments.

FIG. 9 illustrates a graph 900 of ambient light measurements recorded over multiple days, according to some embodiments. As illustrated by graph 900, the ambient light profile measured by the ALS may be periodic, such that it repeats over 24-hour intervals. This repeating ambient light profile may be used to refine the algorithms used by the thermostat processing system. The ambient light profile may also be used to calibrate an internal clock used to distinguish between daylight hours and nighttime hours.

Two general characteristics may be observed in the ambient light profile of graph 900. First, daylight hours may be distinguished from nighttime hours based on the gradual increase and decrease of the ambient light level detected by the ALS. For example, during sunrise the ALS may generally produce a gradual ramp increase response, such as section 910 of graph 900. Similarly, during sunset the ALS may generally produce a gradual ramp decrease response, such as section 912 of graph 900. By detecting these gradual ramp responses, an internal clock may be calibrated by the thermostat. Daytime hours may be determined by looking for a plateau response, such as section 914 of graph 900, whereas nighttime hours may be determined by looking for a flat response, such as section 918 of graph 900.

The second general characteristic that may be observed in the ambient light profile of graph 900 may include dramatic spikes that represent direct sunlight incident on the thermostat housing. Spike 916 may be observable at a regular time interval during each day. Spike 916 may correspond to times when the position of the sun is such that direct sunlight may be aligned with the thermostat through a window, door, skylight, and/or the like. Direct sunlight spikes, such as spike 916, may be identified and used to adjust thresholds for detecting direct sunlight incident on the thermostat housing.

Many different methods may be used to record and generate the ALS profile for the enclosure. In one particular embodiment, a profile generation and analysis routine may be run by the processing system at regular intervals. For example, the profile generation and analysis routine may be run during nighttime hours when user interaction with the thermostat is less likely.

Merely by way of example, one exemplary profile generation and analysis routine may be used that minimizes measurements and conserves memory usage. In one embodiment, memory locations referred to herein as "buckets" may be allocated for time intervals throughout an ALS period. For example, 288 buckets representing 5 minutes intervals throughout a 24 hour period may be allocated in a memory of the thermostat. During each 5 minute interval, the ALS may provide an ambient light measurement that may be recorded in the corresponding bucket. Each bucket may aggregate ambient light measurements in each bucket over a number of ALS periods, such as one week. In this example, each bucket would aggregate seven ALS measurements in each bucket with each bucket's measurement taken at approximately the same time of day throughout the week. The length of the time intervals and the depth of each bucket may be adjusted according to the needs of each particular embodiment. Buckets may represent sliding windows wherein older measurements are replaced with newer measurements.

By aggregating measurements over multiple ALS periods, the aggregated buckets may represent a smoothed or average version of what the ALS profile for the enclosure should look like each day. In one embodiment, the depth of each bucket may be approximately 7 readings, representing approximately one week's worth of ALS measurements. The depth of each bucket may be chosen based on the environmental conditions of the enclosure in which the thermostat is installed. For example, the ALS profile may change due to seasonal weather patterns. Direct sunlight events may be more likely, last longer, and/or generate more heat during summer months than during winter months. Cloud cover lasting more than a few days may also tend to alter the ALS profile of the house. The angle of sunlight may also affect the amount of heat and light incident upon the thermostat, and this angle may change with the tilt of the earth throughout the year. Generally, the depth of each bucket made be chosen such that there are enough measurements to generate a smooth average profile without being affected by seasonal weather changes. In some embodiments, the depth of each bucket may be three days, five days, seven days, ten days, two weeks, three weeks, or even one month, depending on the particular environment in which the thermostat is installed.

After generating the raw ALS profile, an analysis routine may be performed in order to detect direct sunlight spikes and distinguish them from momentary spikes in what may be a noisy measurement environment.

First, the analysis routine may determine which of the buckets corresponds to daylight hours. In some embodiments, the thermostat may have access to a Wi-Fi connection such that the current daylight hours may be retrieved over a wireless network. In other embodiments, the thermostat may be equipped with an internal clock, and daylight hours may be determined according to the internal clock readings. For example, a thermostat without a Wi-Fi connection could determine that the hours between 5:30 AM and 7:30 PM are daylight hours. In some embodiments, the thermostat may also determine the weather and retrieve a corresponding sunrise and sunset time for each day. For example, the thermostat may be configured to access an online weather service, such as www.WeatherUnderground.com to retrieve the sunrise and sunset times for each day.

In some embodiments, a default value may be programmed into the thermostat for the daylight hours, such as between 5:30 AM and 7:30 PM as the ALS profile of the enclosure is developed over time. The ALS profile may be used to adjust the sunrise and sunset times used by the thermostat by detecting the plateau responses such as section 914 of graph 900. Generally, the ambient sunlight that filters into an enclosure during daylight hours will generate a much larger response than artificial light within the enclosure during nighttime hours. According to some experimental data, the ALS response during ambient daylight hours may be 10 to 100 times that of the ALS response due to artificial indoor light.

Ambient sunlight of daylight hours may be distinguished from artificial light sources. The ramp section 910 in graph 900 may be determined to be the gradual onset of daylight hours rather than artificial light provided during nighttime hours within the enclosure. Artificial light that is turned on within the enclosure will have a very steep response, i.e. the change will be abrupt in the ALS profile rather than a gradual ramp increase that corresponds to sunrise. The daylight measured by the thermostat ALS may be used to calibrate the default sunrise and sunset times dynamically. In other words, an assumed interval of daylight hours may be calibrated throughout the life of the thermostat as the ALS builds and analyzes the ALS profile of the enclosure over time.

By determining daylight hours, the algorithm for detecting direct sunlight events and switching between temperature calculation algorithms may enter a low-power mode. In some embodiments, the algorithm may be disabled during non-daylight hours. By turning off the algorithms used to detect direct sunlight and switch between ambient temperature determination algorithms, the thermostat may save power by reducing sensor polling intervals, reducing processor wake-up times, reducing the number of threshold temperatures that need to be checked periodically, and/or reducing the length of time that a processor may need to be awake. By turning of the sunlight correction algorithms, the thermostat may also reduce false positives because it is known that there is no sunlight.

By way of example, the exemplary thermostat comprising a head unit and a backplate described above may be considered. In this embodiment, the low-power backplate processor will typically not perform the direct sunlight detection and algorithm switching routines. Instead, the backplate processor wakes up the head unit processor when the ALS surpasses a predetermined threshold. A state machine may then be advanced in the head unit processor in order to determine new temperature and/or light thresholds, and possibly to switch between ambient temperature determination algorithms.

In some embodiments, the backplate processor can wake the head unit up when it senses a divergence, i.e. when the determined ambient temperature begins to diverge from its previous values. The head unit processor may then walk through a state machine and determine whether or not to instruct the backplate processor to switch between ambient temperature determination algorithms. The backplate processor may provide the head unit processor with the determined ambient temperature using the algorithms selected by the head unit processor. This may be particularly advantageous in thermostats where the backplate processor governs the operation of the one or more temperature sensors.

After generating the ALS profile, the thermostat may use the profile to detect direct sunlight spike intervals and to determine threshold values to be used for real-time spike detection. Generally, thresholds and predictive spike intervals may be determined using heuristic method based on observed statistics. Many different methods may be used to determine thresholds and to detect spikes from the profile data. Some embodiments may analyze the spike slopes to detect fast and slow time changes. Other embodiments may use time convolution with a narrow kernel. Other embodiments may use spectral analysis and/or frequency domain analysis. Some embodiments may use statistical methods to perform inter-day correlation between periodic light measurements. For example, the thermostat processing system may cross-correlate spikes identified in one day with spikes identified in previous days to statistically determine the spike intervals to be used. These different method may involve trade-offs between accuracy, computing power, and/or complexity.

In one particular embodiment, threshold values may be identified statistically using the profile data. For example, the 90th percentile value and the 97th percentile value may be identified and used to generate a threshold. In some embodiments, upper and lower bounds may be placed on the values corresponding to the percentiles used to generate thresholds. For example, an ALS reading of 800 Lux may correspond to a minimum value for detecting direct sunlight in some enclosures. A lower bound somewhat below 800 Lux may be used when generating a threshold. Similarly, an upper bound on the determined thresholds may also be used, such 8,000 Lux, 10,000 Lux, etc.

Adjacent buckets that include measurements above a particular threshold may be identified as direct sunlight spikes. Some embodiments may account for noisy measurements by only identifying spikes that are more and/or less than a particular time value. These embodiments may allow for gaps between buckets that are above the threshold. For example, some embodiments may allow a maximum separation between buckets of three readings. Thus, to buckets above the threshold that are separated by two buckets below the threshold may be considered a single spike. Threshold may also be placed on the duration of an ALS spike. For example, to qualify as a spike, a time interval may need to last longer than 5 minutes and less than 2 hours, according to one embodiment. Threshold values, spike widths, and noise compensation may be determined experimentally for each thermostat embodiment.

In thermostat embodiments that include a head unit processor and a backplate processor, the ALS profile analysis algorithm that identifies thresholds and/or predictive direct sunlight spikes may be carried out by the head unit processor. Often times, these algorithms may be too processing and/or power intensive for the backplate processor. As described above, these algorithms may operate at times when user interaction or HVAC interaction is unlikely, such as during nighttime hours.

In contrast to the ALS profile algorithm described above, a real-time algorithm may also be carried out by the thermostat during daylight hours. After determining specific time intervals during daylight hours when an ALS spike is probable, thresholds can be set during specific time intervals that are different than the threshold set during other time intervals. For example, the direct sunlight event threshold may be set lower during times when the probability of seeing a direct sunlight event is high. Similarly, the direct sunlight event threshold may be set higher during times when the probability of seeing a direct sunlight event is low. These probabilities may be based on the ALS profile described previously. For example, in time intervals where ALS spikes have been detected according to the ALS profile, the direct sunlight event threshold may be lowered.

The values used for the threshold may also be based on the ALS profile. In one embodiment, the higher threshold may correspond to the 97th percentile of the measurements in the ALS profile, while the lower threshold may correspond to the 90th percentile of the measurements in the ALS profile. By identifying time intervals where direct sunlight events are more probable and adjusting the detection thresholds accordingly, the thermostat can minimize the number of false positives and false negatives that would tend to corrupt the determined ambient temperature.

Generally, it may not be sufficient to detect an ALS spike alone in order to switch between temperature calculation methods. Conversely, it may not be sufficient to detect a temperature divergence event alone in order to switch between temperature calculation methods. For example, a high-power artificial light source may be temporarily aimed at the thermostat. This may cause an ALS spike due to the high photon energy incident on the thermostat; however, the high-powered artificial light source usually will not generate enough heat to mimic a direct sunlight event. In another example, the use of a heater in an enclosure could result in temperature divergence without an ALS spike. In other cases, actual direct sunlight events may occur sporadically and unpredictably. Short direct sunlight events may cause an ALS spike without heating the thermostat significantly. Therefore, some embodiments may transition between temperature calculation methods by analyzing both the ALS measurements and temperature measurements.

During a direct sunlight event, the ALS spike may be observed immediately. However, it may take a few minutes before the thermostat itself starts to heat based on the direct sunlight exposure. Therefore, when an ALS spike is detected, the temperature switching algorithm may enter into an intermediate state that analyzes the temperature measurements being made by the thermostat. If the temperature measurements detect that the thermostat is heating, and this heating is correlated with an ALS direct sunlight event, then the thermostat may transition into a sunlight correction mode and switch between temperature calculation methods.

Figure 10:
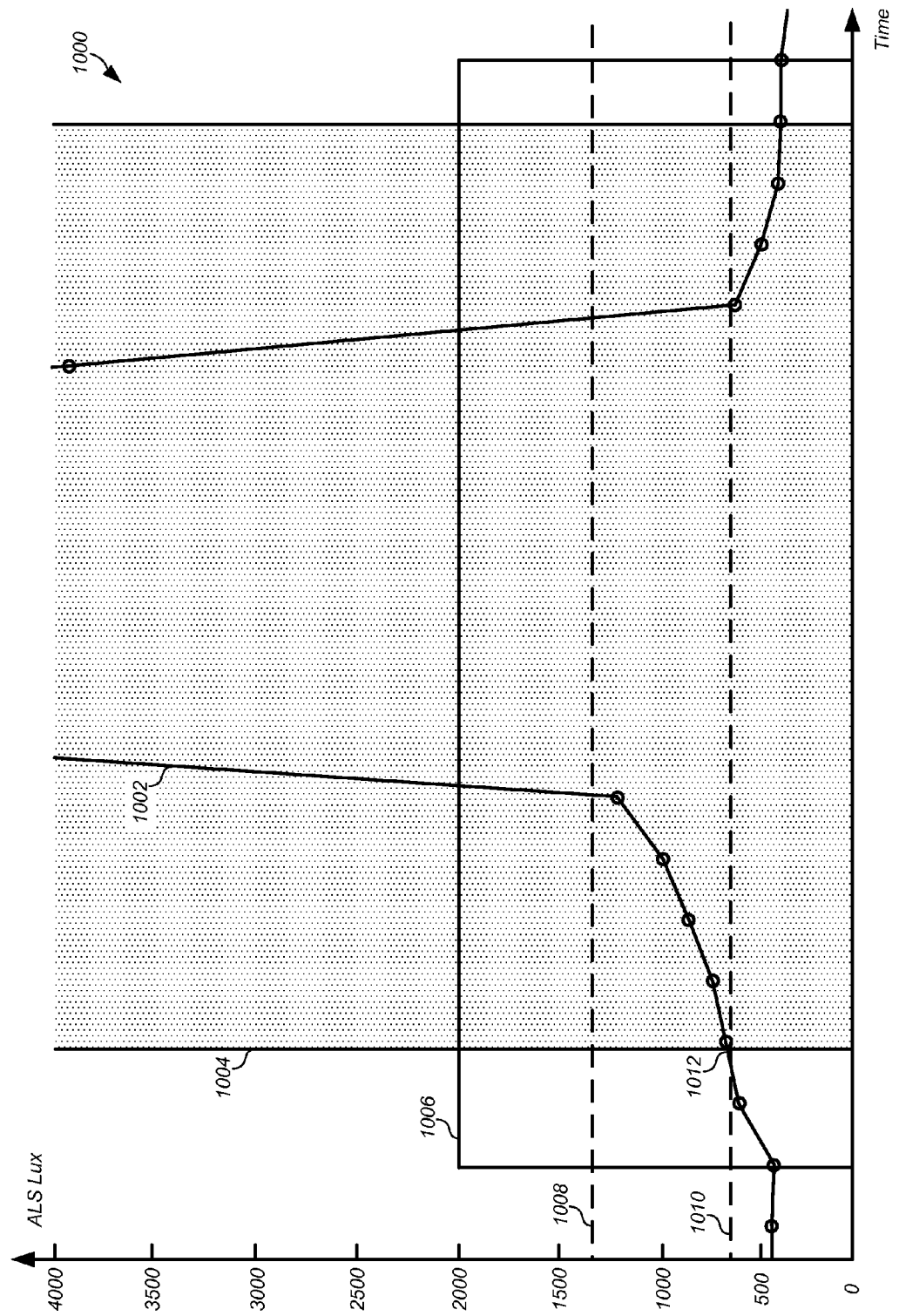
FIG. 10 illustrates a graph of thresholds that may be used with predicted direct sunlight intervals, according to some embodiments.

FIG. 10 illustrates a graph 1000 of thresholds that may be used with predicted direct sunlight intervals, according to some embodiments. Interval 1006 may represent a time interval where a direct sunlight spike may be predicted according to the ALS profile generated for the enclosure. Threshold 1008 may represent an ambient light threshold to be used during time intervals when direct sunlight spikes are not predicted. In contrast, threshold 1010 may represent an ambient light threshold to be used during the time intervals when direct sunlight spikes are predicted, such as interval 1006.

Trace 1002 may represent ambient light measurements provided by the ALS to the thermostat processing system. Before entering interval 1006, trace 1002 would normally be compared to threshold 1008. However, after moving into interval 1006, the ambient light measurements of trace 1002 would be compared to threshold 1010. By adjusting threshold based on predicted profile spikes of the ALS profile, the thermostat can increase its sensitivity to direct sunlight spikes at the correct times, and thus respond more quickly to switch between ambient temperature determining algorithms.

After passing into interval 1006, the ambient light measurements of trace 1002 can be observed to cross threshold 1010 at time 1012 of graph 1000. Upon crossing threshold 1010, the processing system may determine that direct sunlight is incident on the housing of the thermostat. The time interval during which the direct sunlight spike is detected is denoted by region 1004. In some embodiments, the processing system may immediately switch to the second ambient temperature determination algorithm. In other embodiments, the processing system may instead begin to look for a temperature increase that would normally accompany a direct sunlight spike.

In some embodiments, a hysteresis may be considered when crossing threshold 1010 or threshold 1008. Notice that in graph 1000, region 1004 where the direct sunlight spike was detected does not end as soon as trace 1002 goes beneath threshold 1010. Instead, there is a hysteresis buffer of approximately 250 Lux before the transition back to the first ambient temperature determining algorithm takes place. This hysteresis may limit the number of times a head unit processor needs to wake up, and may prevent rapid switching back and forth between the first and second algorithms.

Figure 11:
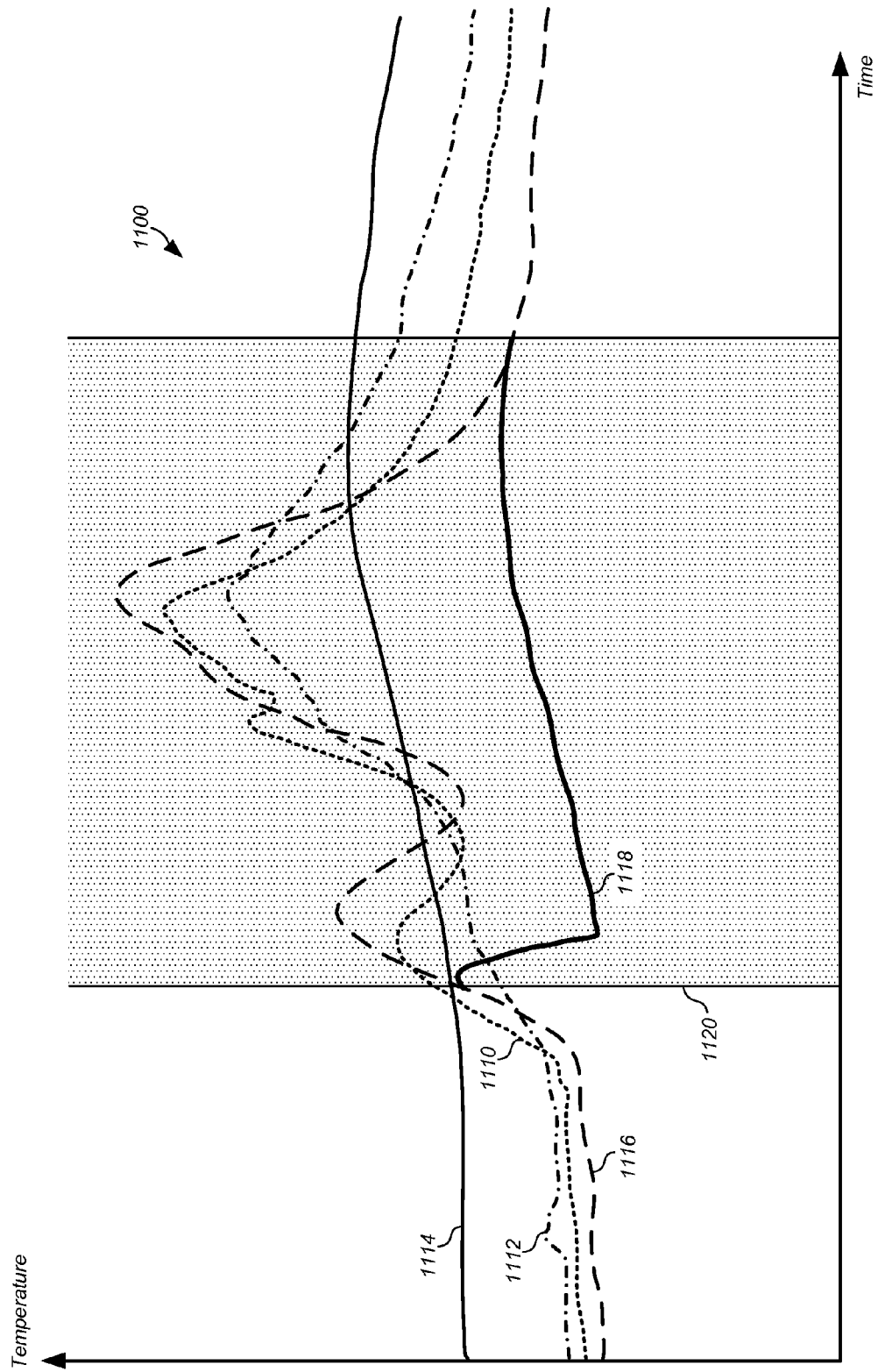
FIG. 11 illustrates a graph of simulated temperature measurements as the thermostat switches between the first and second ambient temperature determining algorithms, according to some embodiments.

FIG. 11 illustrates a graph 1100 of simulated temperature measurements as the thermostat switches between the first and second ambient temperature determining algorithms, according to some embodiments. As direct sunlight becomes incident upon the housing of the thermostat at time $t_1$, the first temperature sensor curve 1110, the second temperature sensor curve 1112, and the third temperature sensor curve 1114 may all begin to increase as the thermostat is heated by the direct sunlight. Note that as described above, the curve corresponding to each temperature sensor changes at different rates and times based on their location and thermal isolation within the thermostat housing.

As sunlight hits the thermostat, the ALS can immediately detect a spike. As the first temperature sensor curve 1110 and the second temperature sensor curve 1112 begins to increase and diverge, the determined ambient temperature curve 1116 begins to increase according to the first ambient temperature determination algorithm. At time $t_2$, the thermostat may determine that the ambient light measurements from the ALS and temperature increases measured by the one or more temperature sensors properly detect a direct sunlight spike. At this point, the thermostat may switch to the second ambient temperature determining algorithm. The results of this switch may be seen by determined ambient temperature curve 1118.

In some cases, the transition between determined ambient temperature curve 1116 and determined ambient temperature curve 1118 may be abrupt and/or discontinuous as shown in graph 1100. This abrupt change may cause unintended consequences and the control of the HVAC system. In order to smooth this transition, some embodiments may use low pass filtering techniques. One embodiment may use an averaging sliding window that averages the last five to ten temperature measurements at, for example, 30 second intervals. Other window length and interval lengths may also be used. In other embodiments, discrete time domain operations may apply digital filters to the determined ambient temperatures to smooth the transition.

Figure 12:
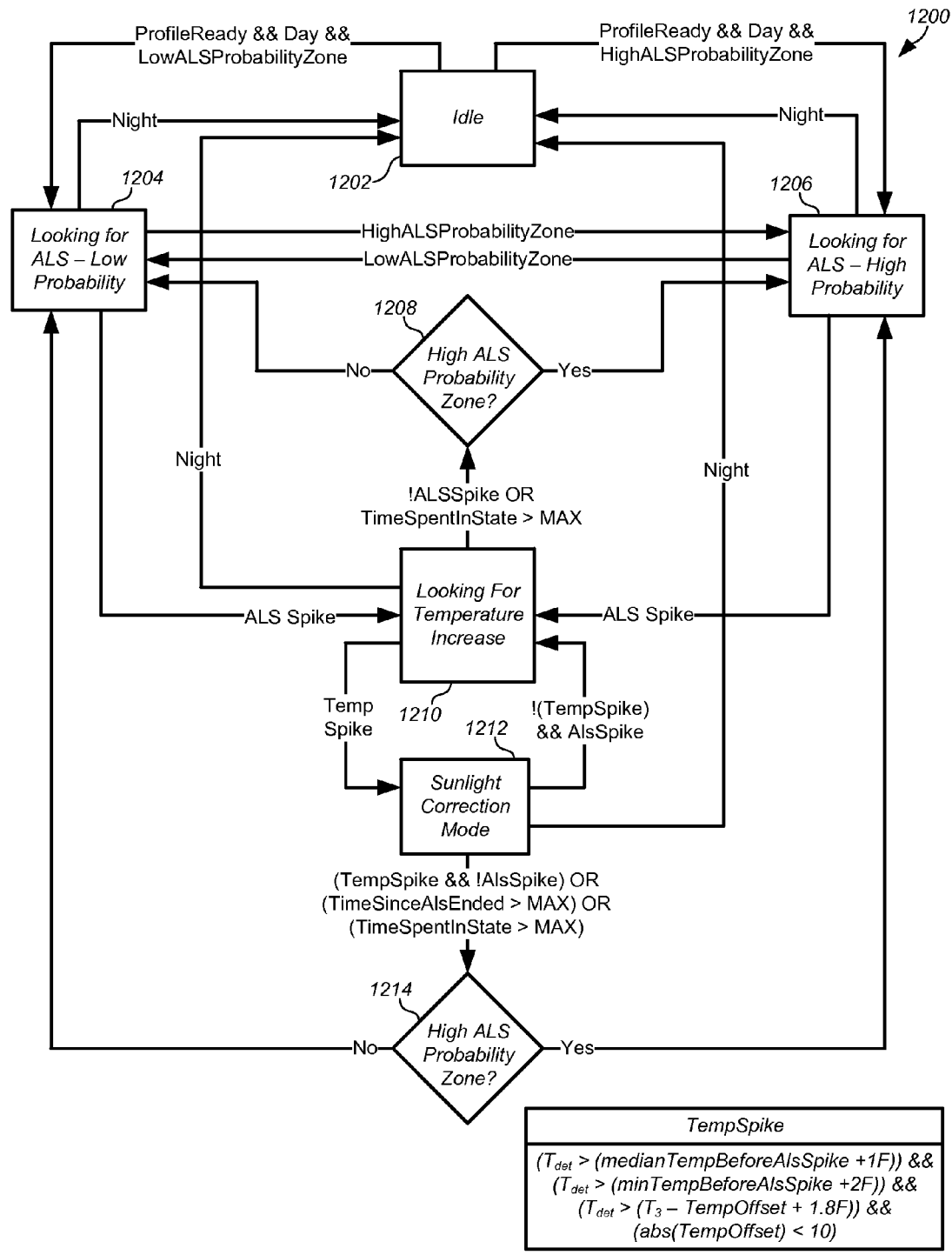
FIG. 12 illustrates a flowchart of an algorithm that may be used to switch between ambient temperature determination algorithms, according to some embodiments.

FIG. 12 illustrates a flowchart 1200 of an algorithm that may be used to switch between ambient temperature determination algorithms, according to some embodiments. Flowchart 1200 may be implemented in software and/or hardware by a state machine. This algorithm may use both ambient light measurements and temperature divergence to switch between ambient temperature determination algorithms.

In embodiments where the thermostat is divided into a head unit and a backplate, the temperature switching algorithm can be run by the head unit processor. The head unit processor can then store transition temperatures and/or ambient light levels in the backplate processor. Sometimes, the head unit processor may step through different stages of the state machine represented by flowchart 1200 each time the head unit processor wakes up. In some cases, multiple stages may be stepped through in each wake cycle, while in other cases, the state machine may remain idle.

The algorithm may stay in the idle state 1202 until the thermostat has enough data in the ALS profile to confidently identify direct sunlight events. In some embodiments, three days of ALS data may be required before the algorithm can leave the idle state. Other embodiments may require one week for the ALS data to be prepared. Depending on the particular enclosure characteristics, the length of the initialization period for the ALS profile to be developed such that it is a dependable representation of direct sunlight event probabilities may be determined experimentally. In some embodiments, the algorithm may also stay in the idle state 1202 at night. The sunrise and sunset times calibrated by the ALS profile may be used to transition back to the idle state 1202 after daylight hours are over.

When the algorithm is ready during daylight hours, the algorithm may advance to state 1204 or state 1206 depending on whether the current time falls within one of the predetermined time intervals wherein a direct sunlight spike is probable according to the ALS profile of the enclosure. The algorithm may switch back and forth between state 1204 and state 1206 as the current time passes in and out of the high probability time intervals.

While in state 1204 or state 1206, the thermostat may receive ambient light measurements from the ALS and compare them to the high threshold or the low threshold, depending on the current state. When the ambient light measurements surpass the threshold, the algorithm may enter state 1210. In state 1210, an ambient light spike has been detected and the thermostat may then watch for a corresponding temperature increase to confirm that direct sunlight is incident on the housing of the thermostat.

In order to transition from state 1210 to state 1212, the algorithm may determine whether there is a temperature increase that corresponds to the ALS spike. In some embodiments, the temperature increase may be detected by comparing future temperatures that are measured after the beginning of the ALS spike with historical temperatures that were measured previous to the ALS spike. Historical temperatures prior to the ALS spike may be used to calculate a temperature baseline. For example, a median temperature measured over a time interval, such as 10 minutes, prior to the ALS spike may be used as a baseline temperature. Similarly, a minimum temperature measured over a time interval prior to the ALS spike may be used as a baseline temperature.

Generally, "temperature divergence" can be used to describe the condition where (i) the determined ambient temperature begins to increase from its historical values, and (ii) the determined ambient temperature diverges from the temperature measurements provided by the third temperature sensor that is less susceptible to direct sunlight heating. In some embodiments, both of these criteria are used to verify a signature of sunlight incident on the thermostat.

Different embodiments may use different conditions to characterize a temperature increase. Some embodiments may watch for a determined ambient temperature that increases above a median temperature by threshold amount, where the median temperature is measured over a time interval immediately preceding the current time. For example, if the determined ambient temperature increases by 2 degrees above the median temperature measured over the last 60 seconds, this may suffice. Other embodiments may perform a similar comparison to a minimum temperature measured over a time interval immediately preceding the current time. Some embodiments may compare the determined ambient temperature to a temperature provided by the third temperature sensor adjusted by the temperature offset. Because the determined ambient temperature should track with the temperature measurements provided by the third temperature sensor according to the temperature offset, deviations from this value may signify heating due to direct sunlight. Some embodiments may also compare the temperature offset to a threshold value. In one embodiment, all of these criteria may be combined into a single logical statement to be evaluated by the processing system. In other embodiments, criteria may be used separately, weighted, and evaluated according to the needs of the particular embodiment. Example criteria are illustrated in FIG. 12.

After the temperature increase has been detected, the algorithm may transition to state 1212 where the second ambient temperature determination algorithm be activated. For example, the head unit processor may instruct the backplate processor to begin using the second algorithm while in state 1212. In some cases, the algorithm may transition from state 1212 back to state 1210 if the direct sunlight spike remains as measured by the ALS but the temperature increase does not persist.

In another situation, the algorithm may transition from state 1212 back to state 1204 or stay 1206 depending upon decision block 1214 and whether the current time falls within a high probability interval for a direct sunlight spike. In some embodiments, this transition may be made if both the measured temperature increase and the measured ambient light increase fall below threshold values. Other embodiments may make this transition after a maximum spike persistence time. For example, the thermostat might only respond to direct sunlight spikes that are less than two hours, according to some embodiments. Some embodiments may also make this transition after a threshold amount of time passes after the end of an ambient light spike regardless of whether the temperature increase persists. Some embodiments may also combine these criteria using logical operators. Example criteria are illustrated in FIG. 12.

The states and steps illustrated by flowchart 1200 are merely exemplary, and not meant to be limiting. Other embodiments may add additional states and additional criteria for transitioning between states.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:
1. A thermostat, comprising:
   a housing;
   a user interface;
   one or more temperature sensors, each of the one or more temperature sensors being configured to provide temperature sensor measurements; and
   a processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature, wherein said processing system is configured to:
   (i) determine time intervals in which direct sunlight is incident on said housing;
   (ii) during time intervals in which direct sunlight is not incident on said housing, process the temperature sensor measurements according to a first ambient temperature determination algorithm to compute the determined ambient temperature; and
   (iii) during time intervals in which it is determined that direct sunlight is incident on said housing, process the temperature sensor measurements according to a second ambient temperature determination algorithm to compute the determined ambient temperature, said second ambient temperature determination algorithm being characterized in that compensation is made for a heating of the thermostat caused by the direct sunlight that is incident on said housing.

2. The thermostat of claim 1, further comprising an ambient light sensor (ALS) that is in operative communication with the processing system, wherein the processing system is configured to receive ambient light measurements from the ALS in order to determine the time intervals in which direct sunlight is incident on said housing.

3. The thermostat of claim 2, wherein the processing system is further configured to construct an ALS profile of an enclosure in which the thermostat is installed using the ambient light measurements provided by the ALS, wherein the ALS profile is predictive of the time intervals in which direct sunlight is incident on said housing.

4. The thermostat of claim 1, wherein the one or more temperature sensors comprises a first temperature sensor, a second temperature sensor, and a third temperature sensor.

5. The thermostat of claim 4, wherein the third temperature sensor is disposed on a rear portion of the thermostat such that the third temperature sensor is less susceptible to the heating of the thermostat caused by the direct sunlight incident on said housing than the first temperature sensor or the second temperature sensor.

6. The thermostat of claim 5, wherein said second ambient temperature determination algorithm calculates said determined ambient temperature using temperature measurements provided by the third temperature sensor.

7. The thermostat of claim 4, wherein said first ambient temperature determination algorithm calculates said determined ambient temperature using temperature measurements provided by the first temperature sensor and the second temperature sensor.

8. The thermostat of claim 1, wherein the processing system comprises:
   a low-power processor; and
   a high-power processor, wherein the high-power processor is configured to calculate temperature and ambient light thresholds to be stored by the low-power processor, the low-power processor being configured to wake the high-power processor from a sleep state when one or more of the temperature and ambient light thresholds are violated by the temperature sensor measurements received from the at least one temperature sensor or an ambient light sensor.

9. The thermostat of claim 1, wherein during the time intervals in which it is determined that direct sunlight is incident on said housing, the processing system is further configured to:
   (i) detect an increase in the determined ambient temperature above a threshold amount; and (ii) switch from the first ambient temperature determination algorithm to the second ambient temperature determination algorithm after detecting said increase in the determined ambient temperature above the threshold amount.

10. A method of compensating for direct sunlight heating in a thermostat, the method comprising:
determining, using a processing system of the thermostat, time intervals in which direct sunlight is incident the thermostat, wherein the thermostat includes:
a housing;
a user interface;
one or more temperature sensors, each of the one or more temperature sensors being configured to provide temperature sensor measurements; and
the processing system disposed within the housing, the processing system being configured to be in operative communication with the one or more temperature sensors to receive the temperature sensor measurements, in operative communication with one or more input devices including said user interface for determining a setpoint temperature, and in still further operative communication with a heating, ventilation, and air conditioning (HVAC) system to control the HVAC system based on a comparison of a determined ambient temperature and the setpoint temperature;
during time intervals in which direct sunlight is not incident on the thermostat, processing the temperature sensor measurements according to a first ambient temperature determination algorithm to compute the determined ambient temperature; and
during time intervals in which it is determined that direct sunlight is incident on the thermostat, processing the temperature sensor measurements according to a second ambient temperature determination algorithm to compute the determined ambient temperature, said second ambient temperature determination algorithm being characterized in that compensation is made for a heating of the thermostat caused by the direct sunlight that is incident on the thermostat.

11. The method of claim 10, wherein the thermostat further comprises an ambient light sensor (ALS) that is in operative communication with the processing system, wherein the processing system is configured to receive ambient light measurements from the ALS in order to determine the time intervals in which direct sunlight is incident on said housing.

12. The method of claim 11, further comprising constructing an ALS profile of an enclosure in which the thermostat is installed using the ambient light measurements provided by the ALS, wherein the ALS profile is predictive of the time intervals in which direct sunlight is incident on said housing.

13. The method of claim 10, wherein the one or more temperature sensors comprises a first temperature sensor, a second temperature sensor, and a third temperature sensor.

14. The method of claim 13, wherein the third temperature sensor is disposed on a rear portion of the thermostat such that the third temperature sensor is less susceptible to the heating of the thermostat caused by the direct sunlight incident on the thermostat than the first temperature sensor or the second temperature sensor.

15. The method of claim 14, wherein said second ambient temperature determination algorithm calculates said determined ambient temperature using temperature measurements provided by the third temperature sensor.

16. The method of claim 13, wherein said first ambient temperature determination algorithm calculates said determined ambient temperature using temperature measurements provided by the first temperature sensor and the second temperature sensor.

17. The method of claim 10, wherein the processing system comprises:
a low-power processor; and
a high-power processor, wherein the high-power processor is configured to calculate temperature and ambient light thresholds to be stored by the low-power processor, the low-power processor being configured to wake the high-power processor from a sleep state when one or more of the temperature and ambient light thresholds are violated by the temperature sensor measurements received from the at least one temperature sensor or an ambient light sensor.

18. The method of claim 10, wherein during the time intervals in which it is determined that direct sunlight is incident on said housing, the processing system is further configured to:
(i) detect an increase in the determined ambient temperature above a threshold amount; and
(ii) switch from the first ambient temperature determination algorithm to the second ambient temperature determination algorithm after detecting said increase in the determined ambient temperature above the threshold amount.

* * * * *